(12) United States Patent
Brombach et al.

(10) Patent No.: US 12,311,799 B2
(45) Date of Patent: May 27, 2025

(54) CHARGING CONTROL OF A FLEET

(71) Applicant: Wobben Properties GmbH, Aurich (DE)

(72) Inventors: Johannes Brombach, Berlin (DE); Aram Sander, Berlin (DE)

(73) Assignee: Wobben Properties GmbH, Aurich (DE)

( * ) Notice: Subject to any disclaimer, the term of this patent is extended or adjusted under 35 U.S.C. 154(b) by 646 days.

(21) Appl. No.: 17/239,296

(22) Filed: Apr. 23, 2021

(65) Prior Publication Data
US 2021/0331603 A1 Oct. 28, 2021

(30) Foreign Application Priority Data

Apr. 28, 2020 (EP) .................................... 20171801

(51) Int. Cl.
*B60L 58/13* (2019.01)
*B60L 53/31* (2019.01)
(Continued)

(52) U.S. Cl.
CPC ............... *B60L 58/13* (2019.02); *B60L 53/31* (2019.02); *B60L 53/63* (2019.02); *B60L 53/66* (2019.02); *G08G 1/20* (2013.01)

(58) Field of Classification Search
CPC .................................. B60L 58/13; B60L 53/66
See application file for complete search history.

(56) References Cited

U.S. PATENT DOCUMENTS

| 7,042,176 | B2 | 5/2006 | Wobben | |
| 10,583,750 | B1 * | 3/2020 | Moon | B60L 53/64 |

(Continued)

FOREIGN PATENT DOCUMENTS

| CN | 102891511 A | 1/2013 |
| CN | 103241130 A | 8/2013 |

(Continued)

OTHER PUBLICATIONS

Kou et al., "Stochastic Coordination of Plug-In Electric Vehicles and Wind Turbines in Microgrid: A Model Predictive Control Approach," *IEEE Transactions On Smart Grid* 7(3): 1537-1551, May 2016.

(Continued)

*Primary Examiner* — Robert Grant
(74) *Attorney, Agent, or Firm* — Seed IP Law Group LLP

(57) ABSTRACT

A method for providing electric exchange power for multiple electric vehicles of a fleet of electric vehicles, for feeding into an electricity supply grid or drawing from the electricity supply grid by way of a charging infrastructure of the fleet, wherein a positive exchange power denotes an electric power drawn from the electricity supply grid by the fleet and a negative exchange power denotes an electric power fed into the electricity supply grid by the fleet, and wherein each electric vehicle has an electrical storage unit having a changeable state of charge, and the sum of the changeable states of charge of the electric vehicles of the fleet, and possibly further changeable states of charge of further storage units, forms a changeable sum state of charge, wherein a state of charge range is determined for a provision period, this state of charge range spanning an operating range that should contain the sum state of charge, wherein the state of charge range is characterized by a time-dependent upper limit that specifies maximum values that should not be exceeded for the sum state of charge in a time-dependent manner, and by a time-dependent lower limit that specifies minimum values that should not be dropped below for the sum state of charge in a time-dependent manner, and wherein the state of charge range is determined on the basis of the states of charge of the electric vehicles, and wherein the electric exchange power is con- (Continued)

trolled in the provision period such that the sum state of charge does not leave the state of charge range.

17 Claims, 3 Drawing Sheets

(51) Int. Cl.
*B60L 53/63* (2019.01)
*B60L 53/66* (2019.01)
*G08G 1/00* (2006.01)

(56) References Cited

U.S. PATENT DOCUMENTS

| | | |
|---|---|---|
| 2015/0283912 A1 | 10/2015 | Shimizu et al. |
| 2015/0291049 A1 | 10/2015 | DeBoer, III et al. |
| 2017/0267115 A1* | 9/2017 | Unno ..................... B60L 58/13 |
| 2018/0001788 A1 | 1/2018 | Geußet al. |
| 2018/0159360 A1 | 6/2018 | Enthaler et al. |
| 2019/0023135 A1 | 1/2019 | Boys et al. |

FOREIGN PATENT DOCUMENTS

| | | |
|---|---|---|
| CN | 104842808 A | 8/2015 |
| CN | 107571860 A | 1/2018 |
| CN | 108173324 A | 6/2018 |
| WO | 03/062018 A2 | 7/2003 |

OTHER PUBLICATIONS

Sanchez et al., "An Improved Methodology for the Hierarchical Coordination of PEV Charging," *IEEE Access* 7:141754-141765, Sep. 2019.

Vandael et al., "A Scalable Three-Step Approach for Demand Side Management of Plug-in Hybrid Vehicles," *IEEE Transactions on Smart Grid* 4(2):720-728, Nov. 29, 2012. (9 pages).

* cited by examiner

CHARGING CONTROL OF A FLEET

BACKGROUND

Technical Field

The present invention relates to a method for providing electric exchange power for multiple electric vehicles of a fleet of electric vehicles, for feeding into an electricity supply grid or for drawing from the electricity supply grid by way of a charging infrastructure of the fleet. The invention furthermore relates to a charging infrastructure for multiple electric vehicles of a fleet for performing such a method.

Description of the Related Art

There is an increasing number of electric vehicles, that is to say an increase in what is known as e-mobility. For a long time now, there have been various concepts for allowing e-mobility also to be used for grid purposes, that is to say in particular for supporting the electricity supply grid and/or for briefly and temporarily providing additional electric power in the event of corresponding demand peaks in the electricity supply grid.

Such technologies are grouped together under the term "vehicle to grid". Such support of the electricity supply grid by way of electric vehicles is described for example in international application WO 03/062018 A2, which also published as U.S. Pat. Pub. No. 2005/127855, which is incorporated by reference herein.

Such support for the electricity supply grid, including the provision of such temporary power, is also referred to as a system service, specifically system service for the electricity supply grid. Many system services in this sense however require very high availability. Thus, if for example power for supporting the electricity supply grid is offered, this also has to be available continuously, such that the electricity supply grid, when it wishes to request such power, also has same available.

For batteries of electric vehicles, this means that these are able to operate in a manner beneficial to the grid only when they have a defined state of charge at the correct time and are connected to a charging point. The corresponding electric vehicles thus have to have available an appropriate amount of storage unit energy, which should also be known, and the electric vehicle has to be connected to the electricity supply grid, that is to say must not be in driving mode at the time.

In the case of automobiles, such high availability often cannot be ensured. In the case of electric motor vehicles in the logistics sector, whose driving activity and times are better known in principle, deviations in the timetable may however also occur, meaning that state of charge and time at which these storage units are able to be accessed vary.

It therefore appears to be impossible or at least hardly practical to introduce an individual vehicle storage unit for such system services, which could also be used as marketing of an individual vehicle storage unit.

One possibility of addressing the problem may be that of aggregating a large number of charging points, to which electric vehicles and thus electrical storage units or batteries are thus able to be connected, over a large spatial extent in order, by virtue of the aggregation, to achieve the required reliability for providing system services. However, the large spatial distribution and the aggregation means that a local effect, in particular a local or locally active system service, is barely possible, and only a small portion of the storage unit in the vehicles is actually able to be used in the case of a given availability requirement.

It has nevertheless been identified however that a large amount of storage capacity of electric vehicles may in principle be available. It would therefore be desirable also to use this for system services.

In the European priority application the European Patent Office has searched the following prior art documents: Publication US 2015/283912 A1; Kou Peng et al., "Stochastic Coordination of Plug-In Electric Vehicles and Wind Turbines in Microgrid: A Model Predictive Control Approach," pages 1537-1551 and Sanchez et al., "An Improved Methodology for the Hierarchical Coordination of PEV Charging," pages 141754-141765.

BRIEF SUMMARY

Provided are techniques that achieves a situation, for a group of electrical storage units of electric vehicles that is as large as possible, whereby at least one system service, in particular grid support and/or provision of exchange power of a significant level, in particular higher than hitherto known for such a group of electrical storage units, is able to be offered in a reliable manner. Provided is an aggregation method for such a group of electrical storage units.

The method thus relates to the provision of electric exchange power for multiple electric vehicles of a fleet of electric vehicles, for feeding into an electricity supply grid or for drawing from the electricity supply grid by way of a charging infrastructure of the fleet. The fleet may be a fleet of electric buses of a transport operator, for example for local public transport. The fleet may then comprise a large number of electric buses, but other vehicles also come into consideration. The fleet may also be a fleet of electric vehicles of a delivery company or supply company. Several such groups of electric vehicles may also be understood to be sub-fleets, such that multiple sub-fleets form the fleet of electric vehicles. The fleet of electric vehicles may then comprise the electric buses, mentioned by way of example, of the transport company and also the vehicles, such as for example trucks or transporters, of the supply company or delivery company mentioned by way of example.

In any case, multiple electric vehicles that travel by way of electrical storage units are present. When these are not traveling, in particular at night, they may be recharged. To this end, it is possible to provide charging points, which may also be referred to as charging terminals. An electric vehicle is then connected in each case to such charging points and may be charged. These charging points together are combined in a charging infrastructure. Such a charging infrastructure may in particular provide a charging controller that coordinates or controls the electric charging of the electric vehicles by way of this large number of charging points.

One part of the charging infrastructure may be a physical connection between multiple charging points. The charging infrastructure may also consist of multiple distributed charging points and/or groups of charging points, wherein such groups of charging points or possibly even individual charging points are each connected on their own to the electricity supply grid. A grid connection point may be provided in each case for this purpose. Provision may however also be made for an individual grid linking point, via which the charging infrastructure feeds into the electricity supply grid, in particular in the case of a company that has a particularly large fleet containing a large number of electric vehicles that are all charged locally at one location.

The electric exchange power may be fed into the electricity supply grid or drawn from the electricity supply grid via this single grid connection point or multiple grid connection points, depending on how the charging infrastructure is configured. According to one illustrative example, the electric vehicles each travel to a charging point in the evening and are charged there overnight. The duration of such a night is in this case often considerably longer than would be required for charging the respective electric vehicles, that is to say for charging their storage units. Electric power may thus sometimes, that is to say partially, also be fed into the electricity supply grid, even when all of the respective electrical storage units are intended to be charged and electric power is drawn from the electricity supply grid for this purpose.

The exchange power may thus be positive and negative. A positive exchange power denotes an electric power drawn from the electricity supply grid by the fleet. A negative exchange power denotes an electric power fed into the electricity supply grid by the fleet. The mathematical sign of the exchange power is thus defined in terms of the charging of the electrical storage units.

Each electric vehicle thus has an electrical storage unit having a changeable state of charge, and the sum of the changeable states of charge of the electric vehicles of the fleet and possibly further changeable states of charge of further storage units form a changeable sum state of charge. The sum state of charge thus combines all of the states of charge of the electric vehicles. However, it is also possible to consider providing for example one or more replacement storage units, or specifically providing one storage unit of the fleet that serves as buffer storage unit. As long as these electrical storage units are also connected via at least one charging point, specifically are able to be charged and discharged and for this purpose are able to exchange power with the electricity supply grid, these may also contribute to the proposed method.

It is then proposed, for a provision period, to determine a state of charge range that spans an operating range that should contain the sum state of charge. This state of charge range may also be referred to as state of charge band or simply band, which however does not have a constant width but extends over this provision period.

This state of charge range or this state of charge band is essentially characterized by a temporal upper limit and a temporal lower limit. The temporal upper limit is thus a limit, that is to say in particular a time-dependent line in a corresponding graph, that specifies maximum values, which should not be exceeded, for the sum state of charge in a time-dependent manner. The state of charge range or the state of charge band is thus below this temporal upper limit.

The temporal lower limit specifies time-dependent minimum values for the sum state of charge, and these minimum values should not be fallen below. The state of charge range or the state of charge band is thus above this time-dependent lower limit.

It is also proposed for the state of charge range to be determined on the basis of the states of charge of the electric vehicles. In particular the starting value or starting range of the state of charge range or of the state of charge band may be determined directly through the states of charge of the electric vehicles at the beginning of the provision period. The state of charge range may also change, and it may thus be initially defined for example for the entire provision period, this definition then being able to be varied further later on. Such variations may likewise depend on the states of charge of the electric vehicles or on the sum state of charge.

It is furthermore proposed for the electric exchange power in the provision period to be controlled such that the sum state of charge does not leave the state of charge range. The state of charge range is thus a specification for the sum state of charge. The sum state of charge may change within this state of charge range. This gives flexibility in terms of controlling the exchange power. If for example a negative exchange power is briefly required in order to support the electricity supply grid, then electric power should be fed into the electricity supply grid from the electrical storage units, and it may thus be checked how the sum state of charge changes as a result. If it changes such that it remains in the state of charge range, then this infeed of electric power, mentioned by way of example, into the electricity supply grid may in principle be carried out. Further criteria may possibly also have to be considered, and these will be discussed in more detail further below.

This in particular makes it possible to provide the possibility of jointly making the entire storage capacity of all of these electrical storage units of the electric vehicles of the fleet available for supporting the electricity supply grid. Specifying the state of charge range and in the process taking into account the sum state of charge and thus taking into account or considering all of the states of charge of the electrical storage units of the fleet makes it possible to control a comparatively large power value. This value may be large enough that it makes sense to the operator of the electricity supply grid to take it into consideration in a targeted manner and possibly also to request power that is able provided within this scope in a targeted manner. The request for power from the electricity supply grid may also include the fact that the electricity supply grid wishes to briefly output excess power. The electrical storage units may also be available for this purpose, and this power output by the electricity supply grid may then be drawn by all of the electrical storage units of the fleet.

This may be performed jointly by the charging infrastructure of the fleet. The electrical storage units of the electric vehicles may in this case however also be spatially distributed. It in particular comes into consideration for multiple sub-fleets to be spatially distributed at one location or one town, but to be coordinated jointly via the charging infrastructure, in particular by way of a charging controller for this charging infrastructure. From the point of view of an electricity supply grid, such a local distribution may still act as a local power source or sink, since such sub-fleets are locally distributed at one location, and this may often mean that they are arranged only a few kilometers away from one another. With appropriate coordination, the electricity supply grid may thus still be locally supported or assisted.

Specifying the state of charge range in the provision period taking into consideration the sum state of charge specifies the scope for this. Reliability and good controllability may thereby be achieved.

This state of charge range thus also makes it possible to achieve a planning capability into which all of the electrical storage units of the vehicles of the fleet are incorporated in a simple and efficient manner. This state of charge range is thus preferably determined in the form of a prediction, for example one day in advance, or half a day in advance. The state of charge range may thereby also give a scope for energy procurement or energy planning. The electrical storage units should ultimately as a result also be charged within this provision period.

However, it also comes into consideration and is preferably proposed for the state of charge range also to be able to be changed during operation. If the state of charge range is determined in the form of a prediction, the provision period is initially in the future. If the current time then reaches the provision period, this may then be worked through, and the exchange power may then thus be specifically controlled such that the sum state of charge is in the state of charge range, that is to say is between the time-dependent upper limit and the time-dependent lower limit.

The state of charge range may however also be changed during this time. There may be various reasons for such changes. Consideration is given in this regard in particular to a change in the actual circumstances with respect to those circumstances assumed for the prediction. By way of example, a storage unit may fail or a temperature drop may lead to the storage units being impaired.

The state of charge range may also be created depending on a timetable for the electric vehicles, which contains for example the times when which electric vehicles should return according to the timetable and each be connected to a charging point and may thereby contribute to providing the exchange power. If an electric vehicle then returns earlier or later than was provided for in the timetable, then this may influence the state of charge range. This influence may result indirectly from a changed state of charge of the respective electric vehicle, but also indirectly from the time at which the electrical storage unit is available.

This is also one example of the changeability of the state of charge range, and more of these are described further below. In any case, the state of charge range may generally be changed, in particular changed adaptively, by being adaptively adjusted to boundary conditions.

This joint planning, in which the sum state of charge and the state of charge range are determined, may be considered to be or referred to as an aggregation or technical aggregation, in particular of the currently available capacities of the electrical storage units of the vehicles of the fleet.

According to one embodiment, it is proposed for the technical aggregation to be characterized with a predefined availability and in particular also forwarded in the form of information. Such technical availability may for example incorporate the magnitude of the probability of failure of an electrical storage unit and how a change or uncertainty of the state of charge range is thereby affected, considering all of the electrical storage units.

It is in particular proposed to carry out an availability consideration. Such an availability consideration incorporates the states of charge and an arrival forecast with a probability distribution. This probability distribution reflects uncertainties in the arrival times and the individual storage unit states. Such an uncertainty value is required in the aggregation in order to calculate and to ensure a minimum availability of the storage units. The uncertainty could be the main reason why, in the case of a required availability, the sum state of charge is smaller than the forecast of the sum of all of the states of charge of the electrical storage units of the electric vehicles.

The exchangeable power that is controlled by the present method may result from the technical aggregation, that is to say the combination of the capacities of the electrical storage units. The exchangeable power may however also depend on the extent to which the electricity supply grid constitutes a limitation. Such a limitation of the electricity supply grid may be a power limitation of the grid connection point that is used, but it may also be the overall transmission capability of a grid section. Assuming a fixed transmission capability of a section of the electricity supply grid, the question as to how much additional exchange power is able to be transmitted via this grid section under consideration then also depends on the extent to which this limit of the power transmission is already being utilized at the time.

The exchangeable power thus also depends on whether the electricity supply grid is currently overloaded or has reached a load limit. The capacity of the charging points, that is to say their charging power, is also relevant. It should in particular be borne in mind that the state of charge range in principle spans a range of available energy, whereas the exchange power concerns a power, that is to say energy per unit of time. In particular the time-dependent upper limit and the time-dependent lower limit that characterize the state of charge range thus depend not only on the energy that the electrical storage units in combination are still able to output and draw, but also on power limits, that is to say how quickly this energy is able to be output or drawn.

For the aggregation, it should thus also be taken into consideration here which storage units are able to draw or output energy at what speed. This property depends not only on the electrical storage units per se, but also in each case on the respective boundary conditions, that is to say in particular the power able to be transmitted or converted. And this may depend on the charging point, the grid connection point or even the corresponding section of the electricity supply grid.

To take one simple example, if two electrical storage units are thus present, are charged to 50% and are of the same size, they may output or draw the energy value of 100% of a storage unit more quickly than if only one electrical storage unit with 100% charge or 100% discharge were to be present.

According to one embodiment, it is proposed for a starting charging point of the state of charge range to be forecast, this being determined by a starting state of charge of the sum state of charge at a starting time. It is thus determined by the starting state of charge and the starting time. The state of charge range is spanned starting from this starting charging point. The starting charging point may also be forecast in the form of a range, such that the starting state of charge and/or the starting time each specify a range. The range should however be small, and the forecast starting time should in particular span at most a range of 10% of the size of the provision period and the starting state of charge should span at most a range of 20% of a maximum sum state of charge.

As forecast, it is in particular proposed for the starting state of charge at the starting time to be forecast. The states of charge that the electrical storage units will have at the starting time are in particular forecast here, and these values may be summed to give the forecast starting state of charge that specifically forms the starting state of charge of the sum state of charge.

In addition or as an alternative, the starting time may be forecast as the forecast for the starting charging point, or as a partial forecast. The starting time is in particular the time when all of the electric vehicles have arrived in the charging infrastructure, that is to say in particular are each connected at a charging terminal. In this respect, the forecast of the starting time is a forecast of the arrival times of the electric vehicles. A timetable of the electric vehicles may therefore in particular be taken into consideration for this forecast.

One possibility is thus for the starting time to be a forecast time at which it is forecast that all of the electric vehicles have reached the charging infrastructure. However, it also comes into consideration for it to be sufficient if not all of the electric vehicles, but rather only some of them, in particular most of them, have arrived.

Another possibility is thus for the starting time to be a forecast time at which a predetermined portion of the electric vehicles has reached the charging infrastructure. The predetermined portion may for example be specified as at least 90%.

In particular when various electric vehicles belong to the fleet, in particular having electrical storage units of different sizes, and/or having different states of charge, it is advantageous to use their state of charge and/or their storage capacity as a measure as to whether enough electric vehicles have arrived.

A further possibility is thus for the starting time to be a forecast time at which enough electric vehicles have reached the charging infrastructure that a sum of their states of charge has reached a specified minimum starting value of the sum state of charge, and one possibility is therefore for the starting time to be a forecast time at which enough electric vehicles have reached the charging infrastructure that a sum of their storage capacities has a specified minimum storage capacity. It is taken into consideration here in particular that it should be expected that the states of charge will have a low value when the electric vehicles have arrived, that is to say when they return to the charging terminal having performed work.

According to one embodiment, there is provision for an expected probability to be assigned to the forecast starting charging point of the state of charge range. Such an expected probability may also be referred to synonymously as availability or probability of availability. This may be an individual value, or two values, specifically in each case one for the starting state of charge and one for the starting time, but there may also be a probability distribution or two probability distributions.

It has in particular been identified that arrival times and states of charge of many vehicles of a fleet may be considered statistically. There is usually an earliest time, which may be for instance 15 minutes before a scheduled arrival time, before which no vehicle usually arrives, that is to say returns to its charging station, since, up to this point, the vehicles have to perform tasks that are often also defined in a timetable. The probability of a vehicle having actually returned up to this point is probably 1%.

At the scheduled arrival time, in principle all of the vehicles have to be considered when all of the vehicles have the same scheduled arrival time. The probability of any individual vehicle arriving, that is to say returning, up to the scheduled arrival time is probably 50%. The probability of a vehicle actually returning up to this point is probably 95%, depending on the number of vehicles, whereas the probability of all of the vehicles having arrived up to this point is very low, since one vehicle or another will always be delayed. At some time, however, all of the vehicles will have returned, meaning that, for example 45 minutes after the scheduled arrival time, the probability of all of the vehicles having returned is very high.

The sum state of charge also behaves in a similar manner, this not being a discrete value. There is a basic assumption as to the remaining charge with which each vehicle returns to the charging station, for example 30%, since they are accordingly configured to perform the tasks but also to have a charge reserve. It is highly unlikely that the sum state of charge upon return will be at least 90%, always with respect to a maximum sum state of charge, which thus forms 100%, since the vehicles have actually traveled. There is probably a 50% probability of said sum state of charge being at least 30%. It is however highly probable that it is at least 5%, since it is highly unlikely that all of the vehicles will travel into their charging station to the point where they have an empty storage unit.

It has now in particular been identified here that it is important for planning to roughly know the sum state of charge, both with regard to an upper and with regard to a lower value, since power or energy procurement for the charging may depend thereon, but also the amount of power or energy that is able to be provided for system services for the grid, such as grid support measures. It has been identified here that such a value cannot be forecast exactly, but that the planning is able to be carried out well when the probabilities for the ascertained value or for multiple values are known. It has also been identified here that probabilities for a fleet are able to be determined well.

One possibility is that of assigning a probability value to a forecast starting state of charge that is specified by a range that has a width of for example 5%. By way of example, a forecast starting state of charge could be 20%-30% of the maximum sum state of charge, and there may be a probability of 50% for this. A forecast starting state of charge of 20-30%, to stay with this example, could be assumed when the forecast has ascertained a value in this range, for example 25%.

As an alternative, a probability density value may also be indicated as expected probability, in order thereby to take into account the situation whereby the starting state of charge is not present in the form of a discrete value. In the example, a probability density value of 50%/(30%-20%)=5 could then be used for the value of the sum state of charge of 25%.

However, it also comes into consideration to indicate a probability distribution as expected probability, that is to say over the entire range of the state of charge from 0% to 100%. This may also be indicated in the form of a probability distribution or in the form of a probability density distribution.

It has likewise been identified that it may also be important for planning to forecast the starting time, since both costs for power or energy procurement and the demand for power or energy for grid support purposes depend on the period in which procurement or support takes place.

It is accordingly possible to create forecasts for a starting time and to supplement these with probability values as expected probability. A starting time of the state of charge range may be defined as the time at which a minimum number of the vehicles are back at the charging infrastructure. This may also be equated to a relative value, for example 90% of all of the vehicles. This may alternatively also relate to the storage unit size thereof, for example 90% of the total storage capacity. Probability values, probability density values, a distribution of the probability values and a distribution of the probability density values also come into consideration here.

It also comes into consideration for the expected probability to be assigned in full to the starting charging point. The expected probability may thus be assigned analogously in the same way to a forecast starting state of charge of the sum state of charge at a forecast starting time. Probability values, probability density values, a distribution of the probability values and a distribution of the probability density values also come into consideration here.

Multiple starting charging points with associated expected probabilities are preferably forecast. To this end, for example, two or more starting charging times may each be assigned a starting state of charge, and a respective expected probability may be assigned thereto. Probability values, probability density values, a distribution of the probability values and a distribution of the probability density values also then each come into consideration here. The forecast may then in particular forecast these expected probabilities, and is in this respect a forecast of the starting charging point.

According to one embodiment, it is proposed to correct deviations between a forecast starting state of charge and a recorded sum state of charge.

When correcting such deviations, power is taken from the electricity supply grid and stored in the storage units of the electric vehicles, or fed into the electricity supply grid from the electrical storage units, depending on whether the forecast starting state of charge is below or above the recorded sum state of charge. The correction may extend over a sub-period of the provision period.

This is based in particular on the concept that, in particular at the beginning of the provision period, such a correction entails few costs, or that there are at least time ranges in the provision period in which few costs thereby arise. Using a good forecast that is able to be achieved in a fleet with a timetable should allow the deviation to turn out to be correspondingly low, meaning that few costs arise. The correction then makes it possible to achieve the forecast sum state of charge. The power or energy procurement based subsequently on the forecast may then be carried out as planned, in spite of the original deviations.

This also leads to the forecast being able to be indicated with a very high probability, possibly even with the probability of 1. This is because, if the forecast deviates, it is able to be corrected. Indicating a high probability makes it possible to procure the required power or energy at lower costs and to offer the power or energy offered for grid support purposes at higher costs. This advantage results every night, when the correction has to be carried out only infrequently and to a lesser extent.

It is in particular proposed to correct such a deviation on the basis of a power offer or power demand of the electricity supply grid, that is to say in particular to select sub-periods in the provision period in which the power offer or the power demand of the electricity supply grid is expedient for the correction. It is thus possible to select particularly inexpensive time ranges in which the correction benefits grid demand, which saves on further costs or even brings about profit.

According to one embodiment, it is proposed for a value of the starting charging point of the state of charge range for a predetermined availability to be forecast in the form of an availability value, in particular for a value of the starting state of charge, that is to say of the sum state of charge, or of the starting time to be forecast in the form of an availability value, in particular for a p50 value, a p90 value, a p95 value, a p98 value or a p99.98 value to be used as availability value.

An availability of the starting charging point indicates a probability of this starting charging point meeting at least one specified minimum property. This is then based on the concept of specifying an availability, that is to say a desired probability, and for this purpose forecasting the at least one minimum property of the starting charging point, for example forecasting it using a timetable and/or using empirical values.

This minimum property then forms the availability value. The availability value may in particular be provided in the form of a p50 value, a p90 value, a p95 value, a p98 value or a p99.98 value, that is to say in the form of an availability value for the underlying probability of 50%, 90%, 95%, 98% or 99.98%.

The availability value, for example p90 value, of the starting state of charge is the minimum state of charge that is reached with a probability of 90%, in particular at a specified starting time. The desired availability or probability, in this example 90%, is thus specified, as is a starting time, for example 18:00, at which this availability should be present. The starting state of charge that is reached at least with a probability of 90% at 18:00 is the availability value. This is thus the p90 value in the example. The availability value may then for example be 25% with respect to a full charge, that is to say the maximum sum state of charge. It is however also possible to take an absolute value, for example 40 kAh, at a given voltage.

The starting state of charge thus forecast may then be offered with an availability of 90% at 18:00, or an associated storage capacity may be offered with the availability at 18:00. If fluctuations in the state of charge do not occur or are negligible over time, the boundary condition of specifying the starting time may be dispensed with.

Instead of the positive state of charge, that is to say how full the storage units are, it is also possible to consider a negative state of charge, that is to say how empty the storage units are, or how much free storage capacity is present. This value is relevant as to how much power is able to be drawn from the electricity supply grid for support purposes. This value may also be particularly relevant to energy procurement for charging the electrical storage units.

The availability value, for example p90 value, to stay with the above example, of the starting state of charge may alternatively denote the starting time at which a specified minimum state of charge of the sum state of charge is reached with a probability of 90%. In this variant, the desired availability or probability is again specified. To this end, the value that the sum state of charge or the starting state of charge should have is specified. To this end, it is possible to specify for example a value of 30% with respect to a full charge, that is to say the maximum sum state of charge, or 50% as value for the free storage capacity.

The availability value that is then forecast is the starting time at which at least 30% of the maximum possible charge is present with a probability of 90%, or at least 50% of the free storage capacity is present. This may for example be 18:30. 18:30 is then the availability value.

This is also based on the concept that the electric vehicles return to the charging infrastructure with a remaining charge, in particular in the evening. The electric vehicles thus gradually arrive and the starting state of charge thereby increases, both the positive one and the negative one, since it is not possible to use either stored energy or the free storage capacity of the vehicles that have not yet returned.

A p90 value is particularly expedient when the intention is to offer control power. This is based on the finding that it is possible to offer a control power when it is available with a probability of 90%. A p90 value is thus proposed in particular as availability value of the starting state of charge.

A very high availability may preferably be expedient for particularly system-relevant grid support, and a p95 value is in particular proposed for this purpose and, in the case of even higher requirements, in particular when they are relevant to stability, a p98 value is proposed. A p95 value, as well as a p98 value, is thus proposed in particular as availability value of the starting state of charge.

It has been identified that requirements of the grid operator may expect that support powers have to be specified with such reliability that they have to be available with a probability of 99.98%. It has been identified that the present infrastructure may be used to offer availability such that a p99.98 value is specifically able to be achieved. A p99.98 value is accordingly proposed as one variant. A p99.98 value is thus proposed in particular as availability value of the starting state of charge.

A p50 value is proposed in particular when procuring amounts of energy is involved. This is based on the finding that the p50 value corresponds to an average expected value, and is therefore expedient here. It is in particular proposed to procure an amount of energy corresponding to the p50 value in this case.

It is thus in particular proposed for a respective expected probability to be assigned to the forecast starting state of charge and/or to the forecast starting time. The starting charging point is thereby able to be planned better.

The expected probability may result from individual probabilities and/or expected values of the individual electric vehicles, specifically both of their arrival times for which there are probabilities and for the individual states of charge for which there are likewise probabilities. The probabilities may in particular be determined more accurately in an adaptive manner or recorded via repeated recordings of individual values and combined to form a distribution.

This is also based in particular on the finding that electric vehicles of a fleet perform tasks that repeat on a daily basis, in particular have timetables that repeat on a daily basis, such that new comparable values are able to be recorded on a daily basis. It is thereby possible to compile statistically evaluable values.

According to one embodiment, it is proposed to span the state of charge range starting from the starting value of the sum state of charge, that is to say the starting state of charge at the starting time, and starting from a minimum value that is specified for the sum state of charge for a target time.

It is thereby possible to provide a starting value and also an end value for the state of charge range. In illustrative terms, the state of charge range broadens starting from the starting value over time and then returns to the minimum value at the target time. The starting state of charge, when the state of charge range is intended to be ascertained in the form of a prediction, may in particular be created in the form of a forecast. This forecast depends in particular on how the timetable for the electric vehicles looks and the extent to which deviations should be expected, as described above. The starting state of charge at a starting time results in particular from how many electric vehicles of the fleet have traveled in the time prior to the starting time. It is in particular assumed that such electric vehicles have traveled throughout the day and their electrical storage unit has thereby accordingly been partially discharged.

The target time for the state of charge range may then be the starting time for the electric vehicles prior to them setting off, that is to say in particular the following morning. To this end, it is possible to provide a minimum value, because the electric vehicles specifically require a certain minimum charge in order to be able to make the journeys that are then to be carried out. If it is known that they do not necessarily have to be fully charged, in each case only the sum state of charge up to the minimum value may be reached, depending on the desire for exchange power. It however also comes into consideration for the storage units to be charged to a greater extent. They then contain more electrical energy in the storage unit than necessary, but in any case not too little, such that they are able to cover the scheduled mileage.

There is in particular provision for the exchange power to be controlled such that the sum state of charge does not leave the state of charge range while the sum state of charge, over the provision period or part thereof beginning from the starting time, containing the starting value, reaches or exceeds the minimum value at the target time. The sum state of charge is thus controlled through the state of charge range from the starting time to the target time. The exact profile of the sum state of charge is in this case variable, as long as it remains within the state of charge range.

It has in particular been identified here that this profile of the sum state of charge may be varied within the spanned state of charge range and that this creates a degree of regulation freedom according to demand, in particular demand of the electricity supply grid for positive or negative exchange power.

There is in particular provision for such desired exchange power to be tailored such that the sum state of charge does not leave the state of charge range. The electrical storage units in the charging infrastructure are controlled accordingly. This may be performed in particular by a charging controller. This charging controller, or other controller, may thus control the exchange power as a common value by actuating the individual electrical storage units accordingly for this purpose. This may be achieved for example using appropriate setpoint values. At the same time, however, it may keep the sum state of charge in the state of charge range, again in the form of a cumulative value. Such a charging controller or other central controller may accordingly decline requests for power exchanges that would lead to the sum state of charge leaving the state of charge range.

In addition or as an alternative, the exchange power may or should be requested from the outset only in a manner such that the sum state of charge does not leave the state of charge range.

According to one embodiment, it is proposed, in order to set the exchange power, for the state of charge range or part thereof to be offered as a variation range and for an exchange rule to be determined on the basis of the variation range, this exchange rule specifying a scope for setting the exchange power such that the state of charge does not leave the variation range.

It is in particular proposed here to specify the extent to which an exchange power is able to be set on the basis of the state of charge range. It should be borne in mind here that the state of charge range basically specifies a range for energy, whereas the exchange power has a physical unit of power and thus energy per unit of time. In the state of charge range, for a brief period in the entire range of the provision period, a certain power in the form of positive or negative exchange power may thus certainly be possible. The outputting or drawing of an exchange power will however continuously have an effect on the sum state of charge, which thereby moves toward the upper or lower limit. The sum state of charge could then leave the state of charge range after a certain time.

There are thus many possibilities for providing an exchange power without the state of charge range being left. It is therefore not possible to unambiguously transform the state of charge range into an exchange power range. The exchange power therefore has to be determined such that the state of charge does not leave the state of charge range or the variation range.

In the simplest case, the variation range is identical to the state of charge range. There may however also be provision for example to leave the starting range or end range of the state of charge range and to provide the variation range only as part of the state of charge range. In any case, the variation range should at no point be outside the state of charge range.

The exchange rule thus specifies this relationship. In one case, the exchange rule may also be configured such that it is designed as a regulation rule in which a desired exchange power is specified for a time interval within the provision period, in particular at the start, this desired exchange power then being input into a model that emulates the behavior of the electrical storage units of the vehicles of the fleet within the charging infrastructure. The model may contain the behavior of the implemented controller that distributes such a value of the exchange power among the individual electrical storage units. This then results, including in the model, in a response of the electrical storage units to the outputting or drawing of the exchange power, and this thus results in a new state of charge and thus also a new sum state of charge for each storage unit. This is then checked as to whether it is still in the state of charge range. The desired exchange power may accordingly retain its value, or has to be reduced or changed.

In an analogously similar manner, provision may also be made to perform a preliminary calculation by way of an appropriate repetition loop in which the exchange power is input as desired, the response of the individual storage units is ascertained by way of a model, and the sum state of charge is thus ultimately ascertained. The sum state of charge thus ascertained may then be checked for the criterion as to whether it has remained in the state of charge range, and a new value for the exchange power may accordingly be checked. A possible exchange power or a profile of the exchange power over the entire provision period or the entire period for which the variation range is specified may thus be checked and thus finally specified. It is thereby also possible to determine a prediction for a profile of the exchange power.

In addition, it is optionally proposed for the exchange rule for the exchange power to have at least one further condition for generating the exchange power. The following conditions come into consideration:

maximum values for the exchange power,
minimum values for the exchange power,
maximum changes in the exchange power, and
minimum changes in the exchange power.

These values should each be understood to be absolute value. The minimum values for the exchange power and the minimum changes in the exchange power are thus in principle negative values. A negative exchange power is thus limited in terms of absolute value, and a negative change in the exchange power is likewise limited in terms of absolute value.

It has in particular been identified here that it is possible to specify values for the exchange power or for a profile of the exchange power that do not bring the sum state of charge out of the state of charge range, but do not come into consideration for other reasons. Even very high values for an exchange power may in particular not bring the sum state of charge out of the state of charge range when such a high power value is specified only for a short enough time. It may however reach other limits that have already been described in part above. Such limits may also be the maximum power output capability of the electrical storage units. The charging points may also specify such a limit, as may the grid connection point or points. The capacities of the electricity supply grid may also represent a limit, in particular in local grid sections.

The same may apply to an excessively large change in the exchange power, in particular excessively large jumps may be unhelpful because they may for example trigger undesired responses in the electricity supply grid.

There is thus provision to take into consideration such conditions in the exchange rule. This is also based on the concept that such conditions may be the result of a large number of complex individual conditions, for example of the individual behavior of each individual charging point and/or of the individual behavior of each individual electrical storage unit. All this may however in particular be combined in combination in the exchange rule. When determining or checking the exchange power, it is possible to proceed easily by using this exchange rule. Such conditions may of course also take into consideration tolerances, such that for example a maximum value for the exchange power lies a certain percentage value below an actual physical limit value of the exchange power. Reliable values for the exchange power are thereby able to be determined, these thus ensuring high reliability and at the same time also being tolerant when boundary conditions may change, such as for example an ambient temperature.

The exchange power is preferably determined depending on the state of charge range and/or it is determined depending on the sum state of charge and/or it is determined depending on a forecast sum state of charge. If the exchange power has been determined on the basis of the variation range, it has already also been determined depending on the state of charge range. This determination may thus be performed indirectly, that is to say via the variation range, or directly, by directly taking into consideration the state of charge range.

It is furthermore proposed for the exchange power to be determined depending on the sum state of charge, specifically either the current one and/or a forecast one. It in particular comes into consideration here to take into account how close the sum state of charge is to a time-dependent upper limit or time-dependent lower limit that characterizes the state of charge range. If the sum state of charge is far away from such limits, the exchange power may preferably be determined in temporally larger increments, or be determined such that larger amounts of energy are involved. If the sum state of charge is however at one of the two limits, it is proposed to determine the exchange power in smaller temporal increments.

According to one embodiment, it is proposed, on the basis of the state of charge range, to offer at least one offered power as range for the exchange power for an offer time range that is within the provision period by virtue of it being possible to vary the exchange power. An offered power is thus created in the form of a range. This may be performed for example by the charging controller. Such an offered power may be transmitted to a grid operator or another controller in the electricity supply grid. The latter may then vary the exchange power in this scope that is defined by this offered power.

The offered power is in this case also specified in the form of a time range, specifically for an offer time range. By way of example, the provision period may last eight hours, specifically for example at night, and an offered power may be specified therein, for example for half an hour. Within this half an hour, the exchange power may thus be used up to the value of the offered power.

It is thereby possible to provide specific power values and ranges with which a grid operator or other controller in the electricity supply grid is able to operate without having to know the internal workings of the charging infrastructure. A simple value is thus issued as a range in which it is possible to operate.

According to one embodiment, it is proposed for the offered power to be offered at least in the form of a power quota for at least one offer time interval within the provision period. This too is based on the observation that the state of charge range in principle defines a space for energy, whereas power values are usually relevant to the planning of the electricity supply grid. It is accordingly proposed to offer such power quotas, at least one power quota. Due to the fact that a power quota is offered in each case for an offer time interval, it is also possible to assign an amount of energy to this temporally limited power quota. The time-dependent power quota may thus be reflected in the state of charge range, specifically through a change in the sum state of charge that would result from the power quota being invoked. At the same time, the electricity supply grid, specifically in particular a grid operator itself or a grid controller, may work with the accordingly offered power values.

According to one refinement, it is proposed for a grid operator of the electricity supply grid or a grid controller for controlling the electricity supply grid to specify the exchange power on the basis of the variation range and/or of the offered power. This is based on the concept that the grid operator or the grid controller receives information about the available storage capacity. Such information may be transmitted, as explained above according to various embodiments.

It also comes into consideration for the state of charge range and possibly also information about current or expected sum states of charge to be transmitted directly. Based on this, the grid operator or the grid controller may then specify exchange power, in particular specify profiles of the exchange power over time. These specified exchange power values are in this case specified such that the sum state of charge does not leave the state of charge range. Based on the exchange powers that are then thus specified, or the individual exchange power, the individual electrical storage units of the electric vehicles of the fleet may draw or output storage power.

A charging controller of the charging infrastructure may particularly preferably divide the specified exchange power among the individual electrical storage units, in particular among the individual charging points to which the electric vehicles are connected. This may take place for example in the form of a control command or in the form of individual specifications for a charging or discharging profile. It is of course possible here as well to incorporate electrical storage units that are not arranged in an electric vehicle of the fleet, but rather that are provided in addition and are able to be actuated.

It is thus preferably proposed for a temporal profile of the sum state of charge to be specified and/or for a temporal profile of the exchange power to be specified on the basis of the state of charge range, in part or in full for the provision period. Specifying such temporal profiles makes it possible to perform appropriately targeted control.

According to one embodiment, it is proposed for the state of charge range to be transmitted to the grid operator of the electricity supply grid or to the grid controller for controlling the electricity supply grid or a section thereof. According to this embodiment, the grid operator or the grid controller directly receives the information about the state of charge range.

It is in particular proposed for the grid operator or the grid controller to specify the sum state of charge on the basis of the state of charge range, in particular to specify the temporal profile of the sum state of charge and, in addition or as an alternative, for the grid operator or the grid controller to specify the exchange power on the basis of the state of charge range. The grid operator or the grid controller may thereby directly take into consideration the state of charge range for its plans. Such plans contain power management in the electricity supply grid.

By virtue of forecasting the state of charge range, in particular through its starting range or starting charging point, in particular the starting state of charge, an energy is also forecast. It is preferably proposed for the controller, according to the forecast energy and/or the power scope that is specified specifically by the state of charge range, to specify a temporal electricity profile, which may also be referred to as electricity schedule. Based on this electricity profile or electricity schedule, it is then possible to define an exchange power at all times and transmit it to a grid operator, or to provide same directly.

The exchange power thus predicted is preferably used to regulate the electricity supply grid. It is in particular thereby possible to offer and provide a primary control power, but other system services may also be offered and provided. To this end, the predicted exchange power may be provided to the grid operator of the electricity supply grid.

The controller that specifies the electricity profile or the electricity schedule may for example be used by an electricity purchaser to plan its electricity purchase. This planning of the electricity purchase may jointly take into account possibilities for regulating the electricity supply grid.

Due to the fact that the state of charge range is transmitted to the grid operator or the grid controller, the grid operator or the grid controller receives this information in the form of available energy potential for power planning. The result of this planning may result in a profile of the sum state of charge and/or a specified exchange power that is then able to be implemented accordingly in the fleet. The profile of the sum state of charge may in particular be implemented in the form of a profile of the individual states of charge for this purpose and/or the exchange power may be implemented in the form of an individual exchange power of each individual electrical storage unit.

According to one embodiment, it is proposed for the sum state of charge to be determined at least partially in the form of a prediction. This is based in particular on the finding that the sum state of charge or its profile depends on its starting value. This starting value is basically the value that is present when—in illustrative terms—all of the electric vehicles of the fleet, after their working day, are connected to the charging points and provide their individual states of charge. Based on known and/or scheduled tasks of the electric vehicles of the fleet, it is possible to estimate their states of charge, but these are not known exactly in advance.

It is however advantageously proposed for this fleet to provide the grid operator or the grid controller with a schedule. To this end, it is proposed to make a prediction, and this contains a prediction about the sum state of charge. Where the sum state of charge is located or will be located within the state of charge range defines how much storage energy or storage power is able to be provided for supporting the electricity supply grid.

Such a prediction may for example be determined in that, depending on the scheduled tasks of the individual electric vehicles, an expected state of charge of each individual electric vehicle or of its storage unit is calculated and a tolerance is specified in this regard, for example 10%. A prediction with tolerance is thereby easily able to be determined and used. It is preferably proposed for the sum state of charge to be determined in the form of a prediction and for a tolerance to be additionally determined and assigned.

The method is in particular repeated every day and the repetition may also make it possible to statistically improve the prediction of the sum state of charge by checking in the repetitions, that is to say upon each repetition, the extent to which the actual sum state of charge or its profile has reached the predicted sum state of charge.

It is in particular proposed in this regard for the state of charge range to be determined at least partially in the form of a prediction on the basis of the sum state of charge thus determined. The starting range of the state of charge range, that is to say the state of charge range at the beginning of the provision period, may in particular depend on the sum state of charge at the time. A prediction of the state of charge range accordingly depends on a prediction of the sum state of charge.

It is proposed in principle here for the determination of the sum state of charge to be repeated cyclically, in particular daily, such that at least one previous sum state of charge precedes a currently determined sum state of charge, and wherein the in each case currently determined sum state of charge is determined on the basis of at least one of the previous sum states of charge. This cyclic repetition makes it possible to improve the prediction for each new run-through. In this respect, the prediction for the sum state of charge and/or for the state of charge range is adapted. Advantages and the way in which a first value is able to be determined have been explained above.

According to one embodiment, it is proposed for the exchange power and/or the sum state of charge to be controlled on the basis of at least one control boundary condition.

Usage costs that define a cost measure for using the electrical storage units may be a control boundary condition. By way of example—to choose a simplified illustrative example—it may be known for the electrical storage unit of the respective vehicle that this may be charged and discharged 1000 times, the important factor here being—likewise taken illustratively—only the number of charging cycles, but not the energy output and stored again in each case. One thousandth of the costs of the electrical storage unit then corresponds to the costs of a charging/discharging cycle. It may then be derived therefrom that the charging and discharging of one kilowatt-hour causes higher costs the less energy is output and drawn per charging/discharging cycle. Such costs may then be compared with a scheduled charging/discharging cycle.

The consequence of taking such usage costs into consideration in this way—to stay with the simplified example—may also mean that as much energy as possible is drawn and output per storage unit. This may mean that the exchange power for one time interval is more expedient in terms of its relative costs the greater it is.

However, it also comes into consideration, when requesting a comparatively low exchange power, for its relative costs to be so high that the exchange power is not requested and the grid operator or the grid controller to instead procure this exchange power from another source or sink.

It also comes into consideration to tailor an electricity profile or the electricity schedule and the provision of system services across the charging processes with respect to one another, that is to say in particular to regulate or to correspondingly specify or forecast them, such that as little feedback as possible comes from the electrical storage units into the electricity supply grid. It is thereby possible to reduce costs, since additional charging/discharging cycles cause costs. It is in particular proposed for the system services to be offered such that a predetermined feedback limit is complied with. The predetermined feedback limit may be specified via a maximum amount of energy that is allowed to be fed back per provision period. The feedback limit may preferably be at most 90%, in particular at most 80% of the maximum amount of energy that may be fed back in the provision period, or that is specified as the maximum to be fed back in the provision period. It has been identified that, in particular starting from such a feedback limit, a jump in costs may occur, this thereby being avoided.

However, it is particularly preferably proposed for a period for the exchange power to be determined depending on the usage costs. Such a period may advantageously be selected when a high demand for such exchange power is present and high costs would be justified by this high demand.

A demand for at least one system service for providing electrical support for the electricity supply grid may likewise be a control boundary condition. It is in particular proposed here for more exchange power and/or a greater change of the sum state of charge to be controlled the greater the demand for a corresponding system service. System services are preferably divided into categories for this purpose. A division into a first category that relates to stability-relevant system services and a second category that relates to system services for cost minimization is in particular proposed.

A system service is in this respect a service in which electric power is fed into the electricity supply grid, is withdrawn therefrom or is at least offered for these purposes, which may be used to support or assist the electricity supply grid.

According to one embodiment, it is proposed, in addition to the electrical storage units of the electric vehicles, for at least one stationary electrical storage unit to be jointly used, each of these having a changeable state of charge. In this case, the changeable sum state of charge is formed from the sum of the changeable states of charge of the electric vehicles of the fleet and the at least one changeable state of charge of the at least one stationary electrical storage unit.

Such an additional electrical storage unit that is arranged in a stationary manner in the fleet makes it possible to increase the exchange power. It is thereby possible to offer more variable exchange power to the electricity supply grid. The fleet may at the same time be made independent or at least more independent from the power supply by the electricity supply grid. Storage units of electric vehicles are often dimensioned such that they allow the vehicle to perform its daily activities, but have to be charged overnight.

There are usually phases at night in which sufficient power is available for charging such electrical storage units. However, should this not be the case on one occasion, such a stationary storage unit in the fleet may possibly—depending on the dimensioning of the stationary storage unit and/or the number of such stationary storage units—make it possible to fully or partially dispense with drawing electric power from the grid if, in this failure case, the electric power is drawn at least partially from the at least one stationary storage unit.

According to one embodiment, it is proposed for the charging infrastructure to have multiple charging terminals, each for charging and discharging a storage unit of an electric vehicle. Such charging terminals may also be referred to as charging points and they are used to charge the electric vehicles in each case and, when exchange power is provided for the electricity supply grid, they may also be at least partially discharged thereby. The charging or discharging process is also actuated via these charging terminals or charging points.

There is optionally provision for the charging terminals to be spatially distributed and for the charging infrastructure to be connected to the electricity supply grid via multiple grid connection points. The charging terminals may thus for example all be arranged on a company premises and be connected to the electricity supply grid via a single common grid connection point. It also comes into consideration for the charging terminals to spatially distributed, that is to say at least two charging terminals or two groups of charging terminals are spatially separate from one another, specifically far enough apart that they feed into the electricity supply grid via different grid connection points.

It has been identified that the proposed joint consideration and control are still able to be carried out. In the case of such a distributed, at least partially distributed structure or infrastructure, it is in particular also possible to determine a sum state of charge, and a state of charge range may be defined for this sum state of charge for the provision period. Joint provision of exchange power for the electricity supply grid thereby comes into consideration, even though multiple grid connection points are provided.

It is furthermore proposed for the charging infrastructure to have a charging controller for controlling the charging and discharging of the individual storage units of the electric vehicles, possibly also including the at least one stationary electrical storage unit. To this end, it is proposed for the charging or discharging to be controlled based on the temporal profile of the sum state of charge as specified on the basis of the state of charge range and, in addition or as an alternative, for the charging or discharging to be controlled based on the temporal profile of the exchange power as specified on the basis of the state of charge range.

It is thus proposed, for the entire fleet, for the state of charge range and/or the sum state of charge to be taken into consideration, the charging controller being provided for the implementation on the individual electrical storage units, with or without a stationary electrical storage unit. This applies or works for the controller in the form of a distributor and for the reception of information in the form of an aggregator. It is thereby not only possible to offer these joint values, including a jointly specified exchange power, jointly for the fleet and to then apply this to the individual electric vehicles or their storage units, but rather it may thereby also be possible to take into consideration the individual boundary conditions of the individual storage units via this charging controller. It in particular comes into consideration here that the individual electrical storage units may have different sizes, may be of different ages, and may thus in particular have different histories. The storage units may thus be electrically degraded to differing extents. Different thermal behavior of such storage units and/or different power limitations of such electrical storage units may also be taken into consideration.

According to one embodiment, it is proposed for the method to be characterized in that an or the charging controller of the charging infrastructure determines the state of charge range for the provision period on the basis of forecast states of charge of the electrical storage units of the electric vehicles and optionally on the basis of at least in each case one further property of the electrical storage units, wherein the provision period in this case is in the future, the state of charge range, an or the variation range, and/or an or the exchange rule is transmitted to an or the grid operator or an or the grid controller, the grid operator or the grid controller specifies the exchange power for the provision period in the form of a temporal sequence, in particular in the form of a prediction, on the basis of the state of charge range, the variation range or the exchange rule, the charging controller controls the exchange power in the provision period in accordance with the specified temporal sequence by appropriately actuating individual charging terminals or the individual charging terminals, wherein, optionally, additional active and/or reactive power for regulating the electricity supply grid is offered to the electricity supply grid on the basis of the state of charge range, the variation range and/or the exchange rule and the sum state of charge.

There is thus provision for the charging controller to initially proceed from forecast states of charge of the electrical storage units. These forecast states of charge may also be referred to synonymously as predicted states of charge or state of charge predictions. The state of charge range for the provision period is determined therefrom. This provision period in this regard is in the future, and a prediction is thus determined.

At least one further property of the electrical storage units may additionally be taken into consideration here. Such a further property may include the abovementioned boundary conditions, such as storage capacity, age or wear of the electrical storage unit, any limitations for drawing and outputting power, and also properties of the periphery, such as a property of the charging point. The property of the charging point may include a limitation on the power able to be output or drawn, and thus a current limitation. This may in this regard in particular be a property of the electrical storage unit, since such an electrical storage unit is often connected at the same charging point in the case of a fleet. It at least comes into consideration for different charging points to be provided for different vehicle sizes.

The state of charge range is then transmitted to the grid operator or the grid controller. Instead of this, a variation range or the exchange rule or a combination thereof may be transmitted to the grid operator or the grid controller. It is particularly advantageous to transmit the state of charge range and/or the variation range that forms a sub-range of the state of charge range together with the exchange rule. The exchange rule thus specifies the relationship between an exchange power to be determined and the state of charge range or the variation range. The grid operator or the grid controller is thus provided with a corresponding planning tool.

The grid operator or the grid controller may then specify the exchange power for the provision period in the form of a temporal sequence on the basis thereof. It may specify the exchange power therefor for the entire provision period or for only part thereof. It also comes into consideration for it to specify the exchange power for the entire provision period in the form of a profile, but for this profile to be changeable for part of the provision period, in particular able to be changed on an ad-hoc basis. This temporal profile of the exchange power is specified in particular in the form of a prediction. The grid operator or the grid controller may thereby achieve planning reliability for the electricity supply grid. The fleet may thereby achieve planning reliability for its procurement costs, it being ensured, at the end of the provision period, when the electric vehicles are thus intended to perform their daily work at the start of a new day, that they have sufficient charge in their storage units.

There is in particular provision for the grid operator or the grid controller to have knowledge about available storage capacities of the fleet by virtue of the state of charge range, variation range or exchange rule. A grid operator or such a grid controller additionally has knowledge about demand and offer of electric power in the electricity supply grid, in particular including in terms of time. The grid operator or the grid controller may then, with knowledge of demand and offer in the electricity supply grid and with knowledge of the storage potential of the fleet, specify advantageous values for the exchange power, in particular said profile of the exchange power.

The charging controller may then, specifically in particular in order to implement this specified exchange power, control the exchange power in the provision period in accordance with the specified temporal sequence by appropriately actuating the individual charging terminals. The charging controller thus distributes the central specification of the exchange power among the individual charging terminals, which may also be referred to as charging points, and thereby controls the charging or discharging of the respective storage units. This may also be referred to as controlling a charging cycle. Of course, it also comes into consideration for the respective specific charging controller of an electrical storage unit not to be arranged physically on the charging terminal, but rather in the vehicle. Communication to the charging controller still takes place via the charging terminal in question.

It is optionally proposed for active and/or reactive power for regulating the electricity supply grid to be offered to the electricity supply grid on the basis of the state of charge range, the variation range and/or the exchange rule and additionally on the basis of the sum state of charge.

It has in particular been identified here that it is possible to provide a reactive power infeed or draw for voltage regulation purposes. Such reactive power provision in this case requires only a certain minimum amount of energy, which is often present to a sufficient degree. The reactive power infeed however also requires corresponding capacities for the current infeed. This may be taken into consideration in the offer for the reactive power infeed.

The exchange power may be understood in principle to be active power. It may be fed in in order to control and also support the electricity supply grid. It is however also proposed here to offer additional active and/or reactive power. Active power may in particular be offered briefly here. Such additional active power is preferably offered in a time range of less than one minute, in particular less than ten seconds. Such a brief active power infeed, which is preferably offered here, may, in particular in the event of a spontaneously occurring grid fault, likewise be offered spontaneously. It is thus proposed to offer electric active power, in particular to offer it briefly, in the event of a grid fault.

The method offers in particular the following aspects. The charging controller of the charging infrastructure may also be referred to as an aggregator or at least partially function as an aggregator. Such an aggregator technically aggregates the potential variations in the states of charge of the individual electrical storage units of the vehicles, which may also be referred to as batteries, to form the state of charge range, which thus forms a flex space. This may be referred to as aggregating the electrical storage units or batteries. When aggregating the batteries, the periphery, such as the charging infrastructure, and in the process in particular the charging terminals may also be incorporated. This state of charge range that thus forms this flex space may in particular be determined for one day in the future and be transmitted accordingly in the form of a prediction.

Building on this, the grid operator or a controller, which may also cooperate with an electricity purchaser or direct marketer, may determine corresponding amounts of energy, for instance one day in advance, based on this flex space, that is to say based on the state of charge range, and specify a profile for the exchange power, which may also be referred to or specified in the form of an electricity schedule. The amounts of energy may accordingly also be considered to be power quotas for time intervals.

In the implementation, that is to say when the period for which the prediction was made is reached and passed through, the charging controller or the aggregator regulates the electricity schedule. It thus orients itself with the electricity schedule or the specified profile of the exchange power and attempts to implement this in the individual electrical storage units. At the same time, the respective state of charge of the individual storage units is recorded, and in the process in particular also the sum state of charge. These individual states of charge or the sum state of charge ultimately have to follow a profile or at least reach a specified end value at the end of the provision period, reach at least one minimum value, and this is corrected by the aggregator.

If slight deviations between the planning and the actual behavior of the electrical storage units thus leads to the respective state of charge not being reached or being exceeded, this may be compensated through appropriate regulation. Slightly more or slightly less current will then possibly flow, or slightly more or slightly less exchange power will be exchanged than was determined in accordance with the prediction. However, in this case, low deviations that are insignificant for grid planning should be assumed.

As described above, it has been identified that one objective may be to draw as little compensation energy as possible and, if this is drawn, to draw it at a price that is as inexpensive as possible. In practice, for example, it may be the case that 90% sum state of charge is sought, but purchasing is performed for 95%. If there is a positive deviation in the required energy of 5%, then the sum reaches only 90%, which is sufficient. If less energy is required, the sum state of charge reaches 100%. The next day, less or more energy is then purchased, meaning that there is always 5% above the minimum state of charge and the timetable is still complied with in the event of energy deviations. Compensation energy is thus that energy that the electricity supply grid has to provide beyond an advertised energy. Such energy is thus not planned for and is therefore often provided at a high price. This should be avoided. Purchasing too much energy is however likewise not a solution, since not drawing energy may also be expensive. Ideally, planning should be performed as well as possible, or use should be made of buffers in the electrical storage units.

A high control quality should be assumed here, and the grid barely needs to retain any reserve power or to procure any compensation energy that would be necessary for any small deviations from the electricity schedule.

Despite specifying the exchange power or the electricity schedule, there may still remain flexibilities by which the exchange power may fluctuate. Within the scope of such flexibilities, including in the sense of electricity trading, it is possible to offer positive or negative exchange powers, including to offer them briefly, for example within one hour or shorter.

The charging controller or the aggregator may thus offer technically remaining flexibilities directly to the grid operator or a controller. These include control powers, that is to say in particular active power, which are able to be provided briefly, and reactive power provision and other system services are also included.

It is preferably proposed, in the scope of the flexibility that exists due to the offered state of charge range, to counteract a low-frequency power fluctuation in the electricity supply grid through a power infeed that is anticyclic with respect thereto.

It is preferably proposed for the charging controller to actuate the individual storage units of the electric vehicles and optionally at least one stationary storage unit, where present, on the basis of at least one control boundary condition. These include the following control boundary conditions.

The storage unit size of the respective storage unit may form a control boundary condition. In particular when dividing the exchange power, it may thereby be taken into consideration what portion of this exchange power the respective storage unit may have.

The respective charging and discharging characteristic of the storage unit may form a further control boundary condition. Such a charging and discharging characteristic is in particular a relationship between charging and discharging cycles, on the one hand, and an expected service life, on the other hand. The charging and discharging characteristic may thus for example express whether the storage unit may be damaged by slight charging and discharging, that is to say for example by only 10 or 20%, to cite just two simple examples. Depending on characteristic, such a storage unit may specifically be more or less tolerant with respect to such charging cycles with a low exchange power.

The storage unit may in particular output one power and draw another power depending on state of charge, state of health, which may also be referred to as health index, depending on temperature and depending on permitted wear. The charging point, which thus specifies the point to which the storage unit is still able to be charged, is also technically limited. This may result in a maximum power that may depend on the state of charge, the time, the temperature, the health index and costs. And a minimum power may also result therefrom.

A wear indicator may form a further control boundary condition that in each case quantifies wear of the storage unit depending on performed charging and discharging cycle and/or depending on a temporal profile of the respective state of charge. It is thereby in particular possible over time to adjust how much power this storage unit is able to output and draw, how great its charging capacity actually is, and how the costs for a charging cycle may thereby change. The charging controller may thus also take this into account for the respective storage units.

A storage unit quality of the respective storage unit may likewise be a control boundary condition. A storage unit quality of the respective storage unit may contain charging and discharging properties, as well as the issue as to how much the storage unit is able to be discharged and how much it is able to be charged. The higher the storage unit quality, the closer the storage unit is able to get to the value of 0% when discharging and to the value of 100% when charging, without in the process suffering damage or becoming highly inefficient.

A location of the charging terminal, that is to say charging point, in question at which the storage unit in question is charged may likewise form a control boundary condition. In particular the distance between the charging terminal and a grid connection point via which the exchange power or part thereof is exchanged with the grid, and also the distance to the closest charging terminal may in this case be a criterion. By way of example, a charging terminal is able to be operated all the more efficiently the closer it is arranged to a grid connection point. The issue as to whether a charging terminal has further adjacent charging terminals with which it is connected together to an electricity supply grid via a joint connection line may influence the efficiency of the charging terminal.

A forecast regarding a state of charge may form a further control boundary condition. This relates in particular to a forecast regarding a profile or end value of the state of charge of a respective storage unit during use of the electric vehicle in question outside the charging station, in particular on the basis of a timetable of the electric vehicle. This may be used to predict or estimate the value of the state of charge when the electric vehicle with its storage unit is connected to a charging terminal or a charging point at the beginning of the provision period. This may be taken into consideration not only to calculate the state of charge space, but also to actuate the respective storage units. This is also based on the additional observation that an exact state of charge of an electrical storage unit is not able to be determined readily or may contain inaccuracies. If the profile of the state of charge or its end value is additionally able to be estimated via a forecast, this may likewise increase accuracy.

A forecast regarding an arrival time of a respective electric vehicle following use of the electric vehicle in question outside the charging station, in particular on the basis of a timetable of the electric vehicle, is proposed as a further control boundary condition. This may also be used to predict when the respective vehicle will arrive and thus when the corresponding storage unit will be available to form part of the sum state of charge with its state of charge. The arrival time may in particular depend on a timetable of the electric vehicle, it often being able to be assumed that such a timetable is not able to be complied with exactly, for example due to traffic situations. Such deviations may be taken into consideration in a forecast regarding the arrival time, which may also be referred to as a prediction. This may be checked anew every day in order then to respectively adjust and thereby improve the forecast.

A respective forecast or specification regarding a state of charge of the electrical storage unit at the end of the provision period is proposed as a further control boundary condition. It is thereby possible to estimate and/or specify the end value of the state of charge space. A minimum value is in particular specified; if for example the timetable of the fleet or of individual electric vehicles changes, it is also possible here to make an adjustment by increasing or decreasing the minimum value. It is possible to make a forecast or prediction in particular for values above such a minimum value that is specified and should be complied with. The upper limit of the state of charge range may thereby change.

A respective departure time of an electric vehicle may be considered to be a control boundary condition. Such a departure time of the electric vehicle indicates the time at which the electric vehicle in question leaves the charging station. This departure time may in particular be taken from a timetable relevant to the electric vehicle in question. It is also a concept here that such a timetable is present in principle, and it is proposed to jointly use this for the method, in particular to improve the method.

A respective charging power of a storage unit of an electric vehicle is proposed as control boundary condition. Such a charging power of a storage unit denotes the power that the storage unit has output and drawn within the provision period. It is possible to read the loading of the storage unit therefrom, and this may be taken into consideration upon actuation, in particular such that storage units having a high charging power are actuated to a lesser extent than those having a low charging power. This may preferably also change from one day to the next.

It is furthermore proposed to take into consideration a respective history about charging cycles of a storage unit that the storage unit has previously run through as control boundary condition. It is possible to derive a loading of the storage unit from such a history about charging cycles. It is then possible to estimate how much the storage unit is still able to be loaded and how much it will still be able to be loaded in the future. The storage unit may accordingly possibly be preserved, and it is possible to achieve a situation whereby the storage units within a fleet are worn to the same extent.

Proposed is a charging infrastructure for multiple electric vehicles of a fleet for providing electric exchange power of the electric vehicles for feeding into an electricity supply grid, or for drawing from the electricity supply grid. Such a charging infrastructure is characterized in that
 a positive exchange power denotes an electric power drawn from the electricity supply grid by the fleet and
 a negative exchange power denotes an electric power fed into the electricity supply grid by the fleet, and wherein
 each electric vehicle has an electrical storage unit having a changeable state of charge, and a charging terminal is provided for each electric vehicle in order to charge or to discharge the storage unit of the electric vehicle, and
 the sum of the changeable states of charge of the electric vehicles of the fleet, and possibly further changeable states of charge of further storage units, forms a changeable sum state of charge, wherein
 provision is made for a charging controller that actuates the charging terminals and determines a state of charge range for a provision period, this state of charge range spanning an operating range that should contain the sum state of charge, wherein the state of charge range is characterized
 by a time-dependent upper limit that specifies maximum values that should not be exceeded for the sum state of charge in a time-dependent manner, and
 by a time-dependent lower limit that specifies minimum values that should not be dropped below for the sum state of charge in a time-dependent manner, and wherein
 the charging controller determines the state of charge range on the basis of the states of charge of the electric vehicles, and wherein
 the charging infrastructure, in particular the charging controller, controls the electric exchange power in the provision period such that the sum state of charge does not leave the state of charge range.

Such a charging infrastructure has multiple charging terminals, specifically one for each electric vehicle. Such a charging terminal may be used to feed power into the storage unit of the electric vehicle in order to charge the storage unit, and to draw it therefrom in order to discharge it. To this end, the power may be exchanged further by the charging terminal with the electricity supply grid.

Provision is also made for a charging controller that actuates the charging terminals and determines a state of charge range for a provision period. To this end, control connections are provided between the charging controller and each charging terminal. These may be of wired or wireless design. Several of them may also be bundled together and routed to a group of grouped charging terminals. In any case, they should be designed such that the charging controller is able to actuate the charging terminals and thus the electrical storage units of the electric vehicles when the electric vehicles with their electrical storage units are connected to these charging terminals.

Overall, the charging infrastructure with its charging controller and its charging terminals as well as associated electric vehicles is thus capable of performing a method according to at least one embodiment described above. The charging infrastructure preferably also has at least one charging terminal for a stationary electrical storage unit, and/or it directly contains this electrical storage unit, such that it is able to be actuated directly by the charging controller.

The charging infrastructure furthermore has at least one grid connection point in order to connect the charging terminals to the electricity supply grid.

The method is performed in full or in part in particular by way of the charging controller. When a grid operator or a grid controller perform method steps, the charging controller communicates directly or indirectly with this grid operator or this grid controller. The charging controller in particular communicates such that it transmits information about the state of charge space, which may also contain a prediction, and/or information about the sum state of charge, which may also contain a prediction, to the grid operator or the grid controller.

The charging controller in particular receives information about expected exchange power values from the grid operator or the grid controller, in particular information about an expected profile of the exchange power over the provision period. The charging controller may then distribute this information among the individual charging terminals for implementation.

BRIEF DESCRIPTION OF THE SEVERAL VIEWS OF THE DRAWINGS

The invention is now explained in more detail below by way of example with reference to the accompanying figures.

DETAILED DESCRIPTION

Figure 1:
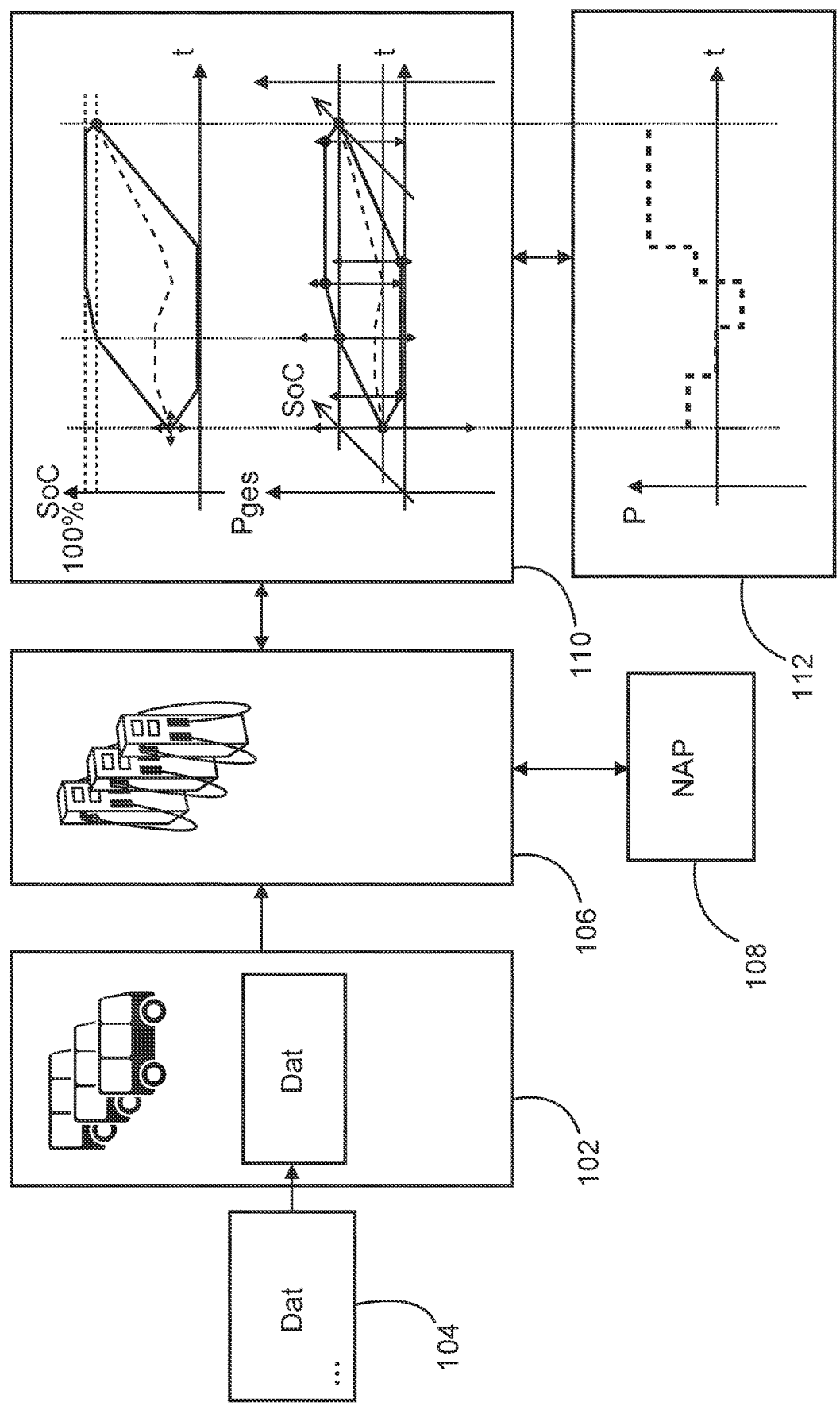
FIG. 1 shows a flowchart for illustrating the proposed method.

The flowchart in FIG. 1 is intended to explain the basic sequence of the proposed method. One concept of the method is that of utilizing storage capacities of a fleet containing electric vehicles in order thus to temporarily make available power to an electricity supply grid on a demand-dependent basis and also of controlling the drawing of electric power from the supply grid in a targeted manner in order to charge the storage units of the electric vehicles of the fleet, taking into consideration the electricity supply grid. The method may also be used to achieve electricity price optimization. The fleet may thus be controlled such that it draws the required charging current as inexpensively as possible and in the process complies with the technical boundary conditions. It has in particular been identified that good planning of the technical resources is important for this purpose, and this may be achieved using the proposed method.

The fleet of electric vehicles is represented by the fleet block 102. The fleet block in this case contains information about the electric vehicles. This information contains information about the storage units of the respective electric vehicle, specifically detailed information, that is to say for each storage unit of each electric vehicle on its own. It also contains information about states of charge of the electrical storage units that the respective storage unit should have before the electric vehicle starts up, in particular in the morning. This is also based in particular on the concept that the fleet of electric vehicles is used for comparatively well-planned tasks, such as for example as an electric bus of a transport company for carrying out local public transport, to cite just one example.

Information about departure times of the respective electric vehicles may accordingly be known in the fleet block 102. The departure times in particular determine when the state of charge of the respective storage unit has to be reached. The departure time however also determines the time from which the storage unit of the corresponding electric vehicle is no longer connected to the electricity supply grid.

The fleet block may however also contain information about the maximum charging power or maximum discharging power that each of the storage units has in each case. Said information may be stored in the fleet block 102, wherein it may also be updated.

An input data block 104 is also shown illustratively. This input data block 104 in particular contains information or data that are highly changeable, in particular those that may change daily and/or may be updated daily. These include a timetable for the electric vehicles, if one is present, which may be present in the form of a bus timetable when the electric vehicles of the fleet are electric buses. Weather data, in particular a weather forecast, may however also be provided by this input data block 104. Such data are input into the fleet block 102 and may be combined or processed together with the data present in the fleet block 102. It is possible in this case, from such input data such as the bus timetable, to calculate or at least to estimate a time when the respective electric vehicle will arrive in the fleet and then be available to draw electric power from the electricity supply grid or to output electric power to the electricity supply grid.

It is also possible to calculate a state of charge of each electrical storage unit at the time when the corresponding electric vehicle arrives at the fleet. For this purpose, it is possible to use the data of the input data block 104, and further data may additionally be calculated from existing data of the fleet block 102, such as in particular the state of charge or expected state of charge of the electric vehicle when it arrives in the fleet. Knowledge about the storage unit, in particular its size, may in particular be used for this calculation. This information is then taken from the fleet block 102.

It is thereby proposed to create a forecast or prediction. This may also take place in the fleet block 102. It is pointed out at this juncture that the method may also in principle be implemented differently than necessarily having to use the explained blocks, such as the fleet block 102 and the input data block 104. These blocks may also for example be linked differently, or multiple input interfaces may be present in order to receive corresponding input data. By way of example, it may be expedient to receive a weather forecast from a source different from the bus timetable or another timetable. In this respect, the flowchart in FIG. 1 serves for basic explanation.

The forecast or prediction may then be transmitted to a charging infrastructure of the fleet. This charging infrastructure is represented by the infrastructure block 106. The infrastructure block 106 may in this case contain information about the charging infrastructure, specifically in particular a maximum charging power that is able to be specified by corresponding charging terminals. These charging terminals are likewise part of the charging infrastructure. An availability of the electrical storage units may also be known in the infrastructure block 106, in particular by virtue of the fact that the charging terminals each provide the information as to whether an electric vehicle is connected thereto, and possibly also what kind of electric vehicle or what kind of storage unit.

These data also result in part from the electrical storage units, and the data may thus possibly be received from the fleet block 102.

The infrastructure block 106 also contains the prediction data, specifically the respective arrival times of the electric vehicles at the charging terminals and likewise the individual states of charge of the electric vehicles as soon as they arrive at and are connected to the charging stations. These data are transmitted in the form of a prediction and processed further.

Provision is also made for a grid connection block 108 that is able in particular to make available information about the electricity supply grid and about grid connection points that are used. The grid connection points are those via which the charging terminals are ultimately connected to the electricity supply grid. The charging infrastructure may in this case be connected to the electricity supply grid via one or more grid connection points.

The grid connection block 108 may provide data about a maximum infeed power, a setpoint voltage and a setpoint reactive power. The maximum power, which may also be referred to as maximum exchange power, is that maximum power that is able to be fed into the grid or that is able to be drawn from the electricity supply grid. The setpoint voltage is in particular a voltage of the electricity supply grid at the respective grid connection point. A setpoint reactive power may be a reactive power that is specified by a grid operator and/or one that results from data of the electricity supply grid. This may include a level of the reactive power to be fed in, this being able to be determined on the basis of the current grid voltage.

All of these data may be provided, specifically to the infrastructure block 106 in accordance with the flowchart in FIG. 1. However, in this case too, such a block division does not necessarily have to take place.

The grid connection block 108 additionally illustrates that both the power able to be provided by the electric vehicles or their storage units, specifically active power, and a reactive power that is able to be provided is output to the one or the multiple grid connection points in order thereby to be fed into the electricity supply grid or to be drawn from the electricity supply grid.

A maximum exchange power for maximum exchange with the electricity supply grid may be determined from these data, in particular in the infrastructure block 106, or drawn. It is also possible to determine a maximum available active power. This may depend in particular on the states of charge of the electric vehicles. The same applies to the available reactive power which, although it requires little storage capacity of the electrical storage units, still requires at least a little storage capacity and additionally also requires free capacities for feeding corresponding current into the electricity supply grid.

In order to coordinate the individual storage units of the electric vehicles of the fleet so as then to be able to offer a common exchange power of the fleet to the electricity supply grid, provision is made in particular for a charging controller, which may also be referred to as an aggregator or may contain an aggregator.

This charging controller or the aggregator uses the information explained above to create a state of charge range. This is illustrated in the aggregation block 110.

The aggregator, represented by the aggregation block 110, uses all of this information that was explained above with reference to FIG. 1 to determine a state of charge range. It is in particular proposed to determine a prediction for such a state of charge range. A state of charge range is spanned, in the form of a region or band, over the sum state of charge and time. This is illustrated in the top graph in the aggregation block 110. This plots the sum state of charge on the ordinate against time on the abscissa. The state of charge range is in this case formed by an upper limit and a lower limit. The sum state of charge runs in this range, that is to say between this upper limit and the lower limit.

Details in this regard and with regard to the lower graph of the aggregation block and also with regard to the exchange power block 112 shown below the aggregation block 110 are explained in more detail below together with FIG. 2.

In any case, the aggregator, which is illustrated by the lower graph in the aggregation block 110, may specify different exchange powers and thus exchange energies at different times, this being able to be shown as a third dimension in the graph. Such possible exchange powers or quotas for exchange powers may be transmitted to the exchange power block 112. The exchange power block 112 may likewise specify exchange power at different times based on availabilities or offers in the electricity supply grid, and thus specify a profile of the exchange power. This is illustrated in the graph of the exchange power block 112; different power levels are accordingly proposed in a time-dependent manner. The profile of the exchange power does not however have to run in levels. It could also run continuously.

Such calculation or specification of power packages or profiles for the exchange power may be carried out on the basis of the state of charge range and the data that the grid connection block 108 provides and that were explained above in connection with the grid connection block 108.

In this respect, the power block 112 or the profile of the exchange power shown by way of example therein may be understood to be a result or at least intermediate result or partial result of the proposed method. It is possible to determine, in particular to predict, a state of charge range from the data regarding the fleet in accordance with the fleet block 102, the data of the charging infrastructure in accordance with the infrastructure block 106, together with the data that the input data block 104 provides.

Based on this state of charge range that is illustrated in the upper graph of the aggregation block 110, it is possible to determine a profile of the exchange power over time, preferably including in the form of a prediction. To this end, it is possible to use in particular data regarding the electricity supply grid with regard to demand and offer that indicate when an exchange power is advantageous and at what level. The state of charge range offers a variation range for this, which may also be referred to as flex space, and thereby specifies the scope within which such a profile of the exchange power is able to be specified. The exchange power is in this case specified such that the sum state of charge remains in the state of charge range.

Figure 2:
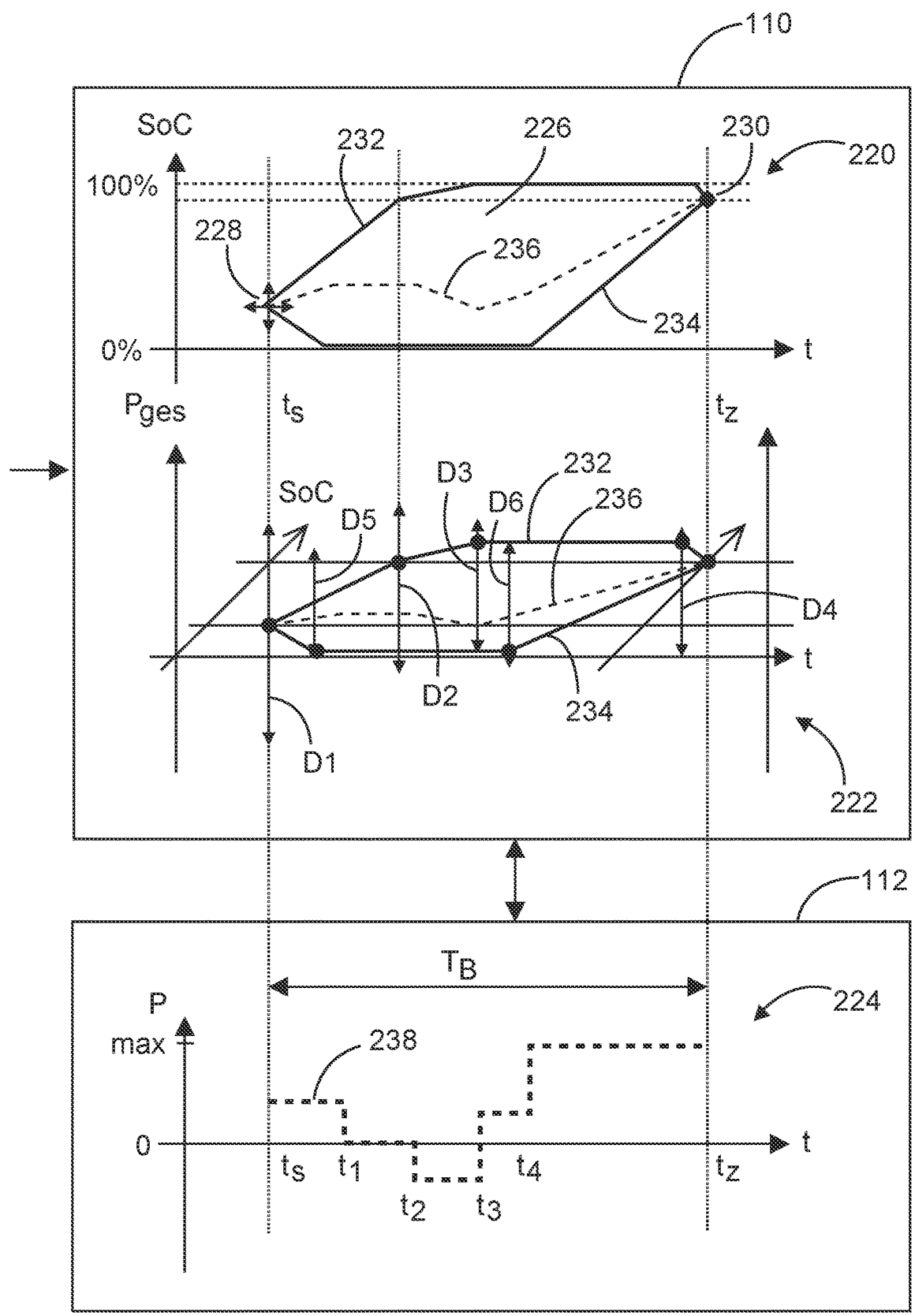
FIG. 2 shows a section of the flowchart from FIG. 1 for illustrating a state of charge range and the application thereof.

FIG. 2 shows a section of the flowchart of FIG. 1, specifically the aggregation block 110 and the exchange power block 112. The aggregation block 110, in the upper region, contains a state of charge graph 220 that illustrates a state of charge range. The lower region of the aggregation block 110 shows a variation graph 222 that builds on the state of charge graph 220 and additionally indicates a couple of variation possibilities for exchange power in an exemplary manner.

An exchange power graph 224 is shown in the exchange power block 112 and illustrates a possible profile of an exchange power over time, that is to say an exchange power profile. All three of these graphs, specifically the state of charge graph 220, the variation graph 222 and the exchange power graph 224, have the same time axis. A starting charging time $t_s$ and a target charging time $t_z$ for the state of charge range are plotted in particular for illustration, and these times are also plotted by corresponding vertical lines in the other two graphs. The starting charging time $t_s$ and the target charging time $t_z$ thus span the provision period $T_B$, which is plotted only in the exchange power block 112 for the sake of improved clarity.

The sum state of charge SoC is basically plotted against time tin the state of charge graph 220. This graph shows the state of charge range 226. The state of charge range 226 begins with a starting charging point 228 and ends with a target charging point 230. The starting charging point 228 is characterized by a value of the sum state of charge SoC and the starting charging time $t_s$. Both the level of the sum state of charge and the starting charging $t_s$ may vary, and are preferably determined through a prediction, as has been explained in connection with FIG. 1, and specifically therein the fleet block 102 in connection with the data that the input data block 104 provides.

The sum state of charge SoC then runs from the starting charging point 228 to the target charging point 230. The target charging point 230 is characterized by the target charging time $t_z$ and by the associated value of the sum state of charge SoC.

While the starting charging time $t_s$ is variable and depends on when the electric vehicles have actually returned to the fleet, the target charging time $t_z$ may be very exactly defined, specifically when the electric vehicles set off, in particular set off in the morning.

The profile that the sum state of charge SoC takes from the starting charging point 228 to the target charging point 230 is comparatively flexible. Precisely this has been identified, and it is proposed for this purpose to specify only limits that span a flex space, which specifically span the state of charge range 226. The state of charge range 226 in this case has a time-dependent upper limit 232 and a time-dependent lower limit 234. The time-dependent upper limit 232 may sometimes reach the value of 100%. All of the electrical storage units would then be fully charged. The lower limit 234 may also at least sometimes reach the lower value of 0%. This however serves only for illustration and it is often not advisable to completely discharge all of the storage units, because they may thereby be damaged. A value other than 0%, for example 20%, may thus be selected as minimum value of the lower limit 234. The same applies to the upper limit 232, for which a maximum value of 90% rather than 100% may be selected. This minimum value and this maximum value may also be selected on the basis of corresponding values of the individual electrical storage units.

The state of charge graph 220 thus illustrates that the upper limit 232 and the lower limit 234 span a state of charge range 226 in which the sum state of charge is able to move. A sum state of charge profile 236 is plotted by way of example in this respect.

It may also be gleaned from the state of charge graph 220 that a variation in the starting charging point 228 also changes the state of charge range 226, at least in its starting region close to this starting charging point 228. The state of charge range 226 accordingly also depends on the prediction of the sum state of charge SoC at the beginning of the state of charge range 226, and it also depends on the prediction with regard to starting charging time $t_s$.

The variation graph 222 contains the state of charge graph 220, wherein the coordinate axis for the sum state of charge SoC points into the plane of the drawing. The time axis has remained and a coordinate axis for the power P has been added. This power P in the variation graph 222 indicates how much exchange power is able to be output or drawn at which key point of the upper limit 232 or lower limit 234. Double-headed arrows D1-D6 are plotted for this purpose.

The double-headed arrow D1 relates to the starting charging point 228 and indicates that, at the time, both positive and negative exchange power are able to be offered to the same extent. The double-headed arrow D2 is plotted at the upper limit 232 and the exchange power may still be increased there, but it may in particular also be offered to a much greater extent with a negative value. At the double-headed arrow D3, and the same applies to the double-headed arrow D4, the upper limit 232 has reached its maximum value, and only negative exchange power is still able to be offered there. It is also the case for the double-headed arrow D4 that negative exchange power not only is able to be offered but also has to be offered in order still to reach the target charging point 230. However, the target charging point 230 may also be specified in the form of a minimum value, and the sum state of charge could then also be situated above this target charging point 230, and the double-headed arrow D4 would then also indicate only a possible negative exchange power. The exchange power could also be zero, but it may also not be positive, this being indicated by the double-headed arrow D4.

It is repeated at this juncture that a positive exchange power is one in the case of which the storage units are charged, and a positive exchange power is thus one in the case of which power is drawn from the grid and is stored in the electrical storage units.

The double-headed arrows D5 and D6 each indicate that only a positive exchange power is possible, because the lower limit 234 has already reached the minimum value here.

In this respect, these double-headed arrows D1-D6 only indicate possibilities and help to define a scope within which the exchange power is then actually able to be varied.

The sum state of charge profile 236 thus indicates a series of multiple sum states of charge. For each of these sum states of charge, that is to say for each point on the sum state of charge profile 236, it is possible to specify an interval or a minimum and a maximum value. Each value then also gives a trend for the sum state of charge that leads to a profile through the state of charge range that allows other exchange powers. Constant changes may in this case lead to a continuous profile. If however an electric vehicle departs or arrives, then the sum state of charge changes abruptly.

A profile of an exchange power, that is to say an exchange power profile 238, is now illustrated by way of example in the exchange power graph 224 of the exchange power block 112. Accordingly, at the starting charging time $t_s$, the exchange power and thus the exchange power profile 238 begins with a positive value. Power is thus drawn from the electricity supply grid and used to charge the storage units. The sum state of charge or the sum state of charge profile 236 accordingly increases. This may be seen both in the state of charge graph 220 and in the variation graph 222. At the time $t_1$, the exchange power profile 238 drops to zero and the sum state of charge profile 236 accordingly has a horizontal region.

At the time $t_2$, it has been planned, that is say predicted, and it is then also implemented, to feed power into the electricity supply grid, because a particularly high demand has been predicted here, which may also result from the fact that a large generator is shut down at night when little power is actually required, and so a power demand may still arise in the electricity supply grid.

This negative exchange power starting from the time $t_2$ may also be identified in the sum state of charge profile 236 through a falling edge.

At the time $t_3$, the exchange power is again changed to a positive value and the sum state of charge accordingly increases again. At the time $t_4$, the exchange power is increased again, and so the sum state of charge profile 236 also runs slightly more steeply starting from $t_4$. All of the storage units are thereby ultimately fully charged, as a result of which the sum state of charge profile 236 reaches the target charging point 230.

It is in particular proposed for the exchange power profile 238, as shown by way of example in the exchange power graph 224, to be determined in the form of a prediction. The grid operator or a grid controller may then work with this prediction and set the grid management in accordance therewith.

Nevertheless, in particular in the range from is to $t_4$, there is the possibility of varying the exchange power on an ad-hoc basis, that is to say of changing the actually specified exchange power profile 238. This may be performed for example when a power demand or else a power surplus offer occurs unexpectedly in the electricity supply grid. This may also be identified for example through a change in the grid frequency. It is thus proposed, when the grid frequency of the electricity supply grid exceeds a predetermined limit value, to increase the exchange power, that is to say to draw more power from the grid, and/or, if the grid frequency drops below a lower frequency value, to reduce the exchange power, that is to say to feed more exchange power into the electricity supply grid.

Figure 3:
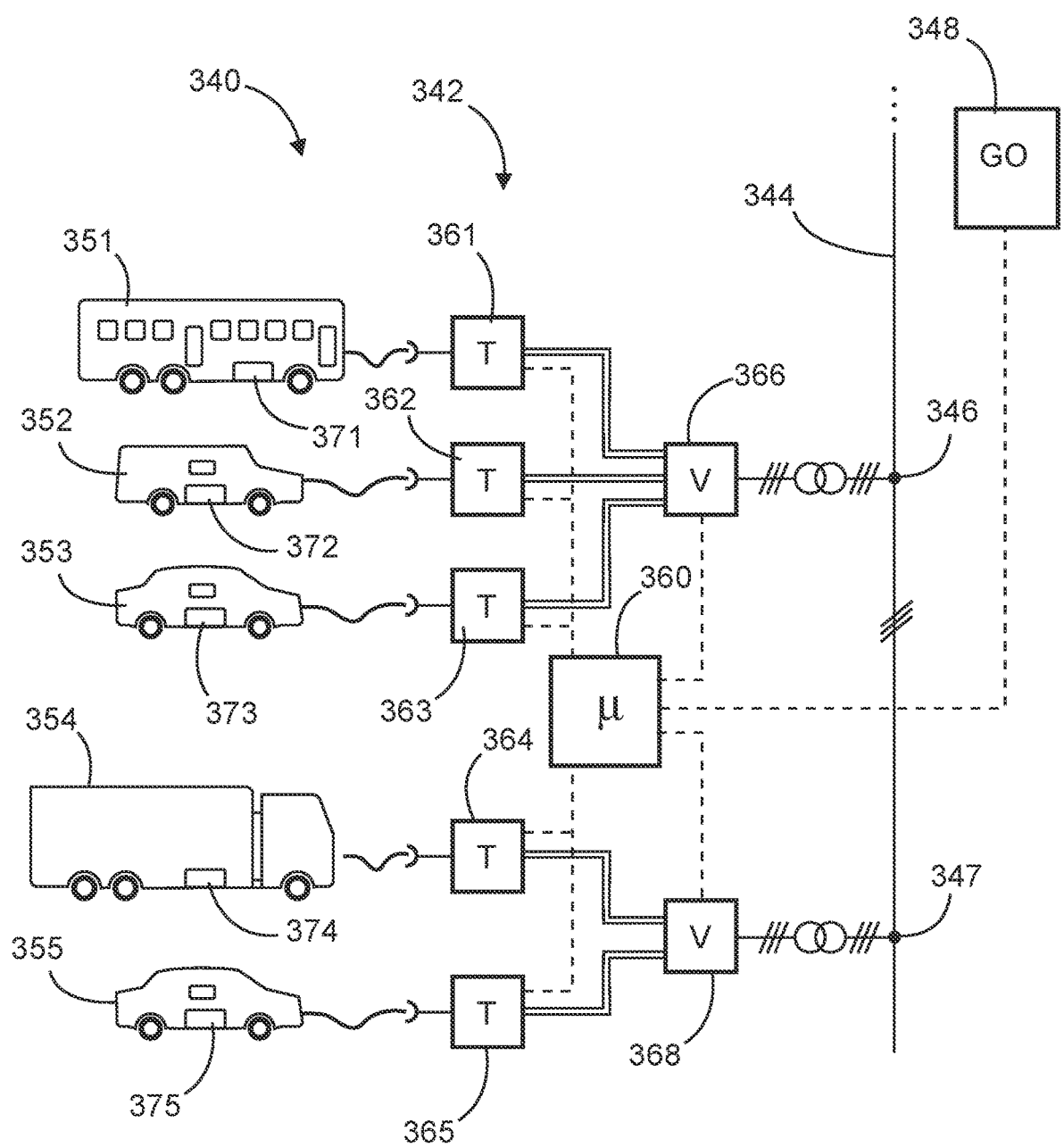
FIG. 3 schematically shows a fleet with a charging infrastructure.

FIG. 3 shows a fleet 340 with a charging infrastructure 342 that is connected to an electricity supply grid 344 via two grid connection points 346 and 347. The electricity supply grid has a grid controller 348 that is able to control the electricity supply grid 344. The grid controller 348 may also be operated by a grid operator.

The fleet 340, by way of example, has five electric vehicles 351-355, each of which are connected to one of the charging terminals 361-365. The charging terminals may be connected to the electricity supply grid 344 via distributor nodes 366 or 368 via a respective grid connection point 346 or 347.

The three electric vehicles 351-353 may thus feed power into or draw power from the electricity supply grid 344 via the grid connection point 346, and the electric vehicles 354 and 355 may feed power into or draw power from the electricity supply grid 344 via the grid connection point 347.

Nevertheless, provision is made for a charging controller 360 that is able to actuate each individual charging terminal 361-365 and thus each storage unit of the electric vehicles 351-355. There is also provision for an optional possibility of the charging controller also being able to actuate the distributor nodes 366 and 368. There is also provision for the charging controller 360 to be able to communicate with the grid controller 348. The charging controller 360 may for this purpose transmit information to the grid controller 348 and receive information therefrom.

The information links between the charging controller 360, on the one hand, and the charging terminals 361-365, the distributor nodes 366 and 368 and the grid controller 348 are basically shown in dashed form. Power or energy transmission is possible via the other lines, which are illustrated in unbroken form.

The charging controller 360 may have stored information about properties of the charging infrastructure 342 and/or receive it in the form of up-to-date data. It may also have stored information about properties of the electrical storage units of the electric vehicle 351-355 and, in particular via the charging terminals 361-365, receive and process up-to-date information about the state of charge and possibly other properties of the respective storage units of the electric vehicles 351-355.

It is thus possible with the charging controller 360 to control all of the exchange power that is exchanged between the charging infrastructure 342 and the electricity supply grid 344. This exchange power is in this regard the sum of the partial exchange powers that are exchanged with the electricity supply grid 344 via the grid connection point 346 and the grid connection point 347.

Electrical storage units 371-375 are additionally indicated in the electric vehicles 351-355 for the sake of illustration.

What is thus proposed is a method that advantageously utilizes the capacity of a fleet of electric vehicles. This makes it possible to provide system services, in particular for grid support purposes. It is possible for this purpose to offer an energy reserve, and an arbitrage transaction is also possible, and both may be offered to the electricity supply grid or a grid operator.

The method may in principle be applied to any charging infrastructure and to structures with fast-charging DC charging terminals in a logistic composite network. A bidirectional charging infrastructure is utilized. It is advantageously possible to implement a combination with stationary storage units, at least with one stationary storage unit.

It has been identified that a charging infrastructure that is able, at all times and without any restrictions, to always exchange the full charging power with the electricity supply grid, which is also referred to simply as grid, requires great overdimensioning of the grid infrastructure and thus brings about higher connection and grid usage costs. It has additionally been identified that electricity price procurement may also be optimized by shifting or even feeding back energy. In the case of shifting the energy that is used to charge the electric vehicles, the energy required for charging is not recovered as quickly as possible, but rather at least partially recovered later on, and thus shifted to this later region.

As a synergistic effect, it is in particular possible to achieve a situation whereby the combination of inexpensive electricity procurement, offering of system services and lower demand on the grid, and thus lower grid recompense and possibly lower grid development, ultimately results in lower energy costs for operating the vehicles for the operator of the charging infrastructure.

It is thus in particular also proposed to improve a conventional charging infrastructure with simple load management.

The proposed technical solution makes it possible to minimize electricity prices through improved utilization of the grids and to increase the commercial degree of use of motor vehicles carrying storage units. It is possible to generate additional revenue due to the fact that the mobile storage units of the electric vehicles are used for system services and an electricity arbitrage transaction when these are connected to the respective charging terminal or charging point. It is additionally proposed for the described advantages also to be assessed taking into consideration application-specific wear costs. To this end, it is possible to ascertain and take into consideration a wear indicator depending on the respective state of charge and/or on the respective charging power.

This is also based in particular on the concept of performing sensible aggregation of charging points or electrical storage units, which may optionally take place in conjunction with other local storage units or mobile storage units. It has in particular been identified that electric motor vehicles in local public transport may use the electricity storage units, to the benefit of the grid, when charging.

In the proposed aggregation, which is described in particular in connection with FIG. 2 and there in particular in connection with the aggregation block 110, a technical aggregation is combined with a timetable and a state of charge and arrival forecast of the electric vehicles. This makes it possible to use a very high proportion of the storage capacity with high availability for global and local system services and/or electricity arbitrage transactions.

It is in particular proposed, for the aggregation, to use the following input variables and boundary conditions, specifically the storage unit size of each vehicle, which may also be referred to as battery size, service life-relevant battery characteristics, state of charge-dependent and power-dependent wear indicator, battery quality, that is to say storage unit quality, of the storage unit of the corresponding electric vehicle, properties of the charging point of the electric vehicle, a forecast regarding the state of charge upon arrival of the vehicle or vehicles, a forecast with regard to the arrival time of the electric vehicles, a target state of charge in the form of a state of charge at the end of the state of charge range, that is to say when the electric vehicles should depart again, departure times of the electric vehicles, wherein the last four input variables may be taken into consideration depending on a timetable, and a charging power from a bidirectional point of view. The last point contains a battery power, or storage unit power, and/or a charging point power, and thus takes into consideration properties of the electrical storage unit and also of the charging terminal or of part of the charging infrastructure.

It is in particular proposed for the aggregator to create a flexibility space on the basis of said boundary conditions, this in particular corresponding to or containing the state of charge range in which the sum state of charge, the exchange power and the wear indicator evolve over time. This flexibility space or state of charge range may also be understood to be or referred to as a band. Based on such a band, a grid operator or electricity trader may specify an optimized electricity schedule via a grid controller. This takes into account both the usage costs of the aggregated electricity storage units, that is to say of the electrical storage units of the vehicles, a current price, in particular the share price, local grid usage costs and opportunities for providing global and local system services, and also opportunities for an electricity arbitrage transaction.

To this end, the aggregator may receive the electricity schedule and regulate the individual charging points, specifically with connected mobile and/or stationary storage units, such that the schedule is complied with, specifically including in the event of deviations from a previously generated forecast.

A grid operator may additionally also directly request or use a system service based on the flexibility space, or offer the electricity trader a load transfer potential. It also comes into consideration for the grid operator to specify time-dependent power limits in which the flex space, that is to say the state of charge range, is allowed to move.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing electric exchange power for a plurality of electric vehicles of a fleet of electric vehicles for feeding into an electricity supply grid or drawing from the electricity supply grid by way of a charging infrastructure of the fleet, wherein the electric exchange power comprises:
   a positive exchange power that denotes an electric power drawn from the electricity supply grid by the fleet; and
   a negative exchange power that denotes an electric power fed into the electricity supply grid by the fleet; and wherein:
      each electric vehicle has an electrical storage unit having a changeable state of charge, and
      a sum of the changeable states of charge of the electric vehicles of the fleet forms a changeable sum state of charge, the method comprising:
         determining a state of charge range for a provision period, wherein the state of charge range spans an operating range that contains a sum state of charge, wherein the state of charge range is delimited by:
            a time-dependent upper limit that specifies maximum values not to be exceeded for the sum state of charge in a time-dependent manner, and
            a time-dependent lower limit that specifies minimum values not to be dropped below for the sum state of charge in a time-dependent manner,
         determining the state of charge range is based on the states of charge of the plurality of electric vehicles,
         controlling the electric exchange power, for feeding into the electricity supply grid and drawing from the electricity supply grid, in the provision period such that the sum state of charge does not leave the state of charge range,
         forecasting a starting charging point of the state of charge range by determining a starting state of charge of the sum state of charge at a starting time, wherein the starting state of charge is forecast at the starting time, and/or
         wherein the starting time is forecast, such that:
            all of the plurality of electric vehicles have reached the charging infrastructure,
            a predetermined portion of the plurality of electric vehicles has reached the charging infrastructure,
            a number of electric vehicles of the plurality of electric vehicles have reached the charging infrastructure such that a sum of their states of charge has reached a specified minimum starting value of the sum state of charge, and/or
            a number of electric vehicles of the plurality of electric vehicles have reached the charging infrastructure that a sum of their storage capacities has a specified minimum storage capacity,
         assigning an expected probability to the forecast starting charging point of the state of charge range, and
         assigning an expected probability in each case to the forecast starting time, wherein:
            deviations between a forecast starting state of charge and a recorded sum state of charge are corrected, and
            a value of the starting charging point of the state of charge range for a predetermined availability is forecast as an availability value.

2. The method as claimed in claim 1, wherein the availability value is a value of the starting state of charge or of the starting time is forecast, wherein the availability value is a p50 value, a p90 value, a p95 value, a p98 value or a p99.98 value.

3. The method as claimed in claim 1, wherein:
   starting from a specified minimum starting value of the sum state of charge as starting state of charge at a starting time, and
   starting from a minimum value that is specified for the sum state of charge for a target time, the method comprising:
      controlling the electric exchange power such that the sum state of charge does not leave the state of charge range, while the sum state of charge, over at least a portion of the provision period:
         begins from the starting time having the starting value, and
         reaches or exceeds the minimum value at the target time.

4. The method as claimed in claim 1, wherein,
   in order to set the electric exchange power, the state of charge range or a part thereof is offered as a variation range and an exchange rule is determined based on the variation range, wherein the exchange rule specifies a scope for setting the electric exchange power such that the state of charge does not leave the variation range,
   the exchange rule for the electric exchange power has at least one condition for generating the electric exchange power, the condition chose from:
      maximum values for the electric exchange power,
      minimum values for the electric exchange power,
      maximum changes in the electric exchange power, and
      minimum changes in the electric exchange power.

5. The method as claimed in claim 1, wherein the electric exchange power is determined depending on one or more of:
   the state of charge range,
   the sum state of charge, and
   a forecast sum state of charge, wherein based on the state of charge range, at least one offered power is offered as a range for the electric exchange power for an offer time range that is within the provision period,
wherein the offered power is offered at least as a power quota for at least one offer time interval within the provision period, or
wherein a grid operator of the electricity supply grid or a grid controller for controlling the electricity supply grid specifies the electric exchange power based on a variation range and the offered power.

6. The method as claimed in claim 1, wherein, based on the state of charge range, partially or completely for the provision period,
specifying a temporal profile of the sum state of charge and/or
specifying a temporal profile of the electric exchange power.

7. The method as claimed in claim 1, wherein:
the state of charge range is transmitted to a grid operator of the electricity supply grid or to a grid controller for controlling the electricity supply grid or a section thereof,
the grid operator or the grid controller, based on the state of charge range,
specifies a temporal profile of the sum state of charge, and/or
specifies a temporal profile of the electric exchange power.

8. The method as claimed in claim 1, comprising:
determining the sum state of charge at least partially as a prediction,
determining the state of charge range as a prediction based on the determined sum state of charge, and
periodically repeating determining the sum state of charge such that at least one previous sum state of charge precedes a currently determined sum state of charge, and wherein, in each case, the currently determined sum state of charge depends on at least one of the previous sum states of charge.

9. The method as claimed in claim 1, wherein:
the electric exchange power, or the sum state of charge, or both is controlled based on at least one control boundary condition chosen from:
usage costs that define a cost measure for using the electrical storage units, and
a demand for at least one system service for providing electrical support for the electricity supply grid.

10. The method as claimed in claim 1, wherein, in addition to the electrical storage units of the plurality of electric vehicles,
at least one stationary electrical storage unit is jointly used, each of the at least one stationary electrical storage unit having a changeable state of charge, and
the changeable sum state of charge is formed from the sum of the changeable states of charge of the plurality of electric vehicles of the fleet and the at least one changeable state of charge of the at least one stationary electrical storage unit.

11. The method as claimed in claim 1,
wherein the charging infrastructure has a plurality of charging terminals, each charging terminal being configured to charge and discharge the electrical storage unit of an electric vehicle of the fleet of electric vehicles,
wherein the plurality of charging terminals are spatially distributed from each other, and the charging infrastructure is coupled to the electricity supply grid via a plurality of grid connection points, and
wherein the charging infrastructure has a charging controller for controlling the charging and discharging of the individual storage units of the electric vehicles, wherein the charging and discharging is controlled based on at least one profile chosen from:
a temporal profile of the sum state of charge, and
a temporal profile of the electric exchange power.

12. The method as claimed in claim 1,
wherein a charging controller of the charging infrastructure determines the state of charge range for the provision period based on forecast states of charge of the electrical storage units of the electric vehicles, wherein the provision period is in the future,
wherein the state of charge range, a variation range, and/or an exchange rule is transmitted to a grid operator or a grid controller,
wherein the grid operator or the grid controller specifies the exchange power for the provision period in the form of a temporal sequence or in the form of a prediction, based on the state of charge range, the variation range or the exchange rule,
wherein the charging controller controls the exchange power in the provision period in accordance with the specified temporal sequence by appropriately actuating individual charging terminals or the individual charging terminals, and
wherein additional active power and/or reactive power for regulating the electricity supply grid is offered to the electricity supply grid based on the state of charge range, the variation range and/or the exchange rule and the sum state of charge.

13. The method as claimed in claim 1, wherein:
the charging controller actuates the individual storage units of the electric vehicles and at least one stationary storage unit based on at least one control boundary condition chosen from:
a respective storage unit size of the respective storage unit,
a respective charging and discharging characteristic of the storage unit, which describes a relationship between charging and discharging cycles and an expected service life,
a wear indicator that in each case quantifies wear of the storage unit depending on performed charging and discharging cycles and/or depending on a temporal profile of the respective state of charge,
a respective storage unit quality of the respective storage unit,
a respective location of a charging terminal (charging point) at which the storage unit in question is charged,
a respective forecast regarding a profile or end value of the state of charge of a respective storage unit during use of the electric vehicle in question outside a charging station, on the basis of a timetable of the electric vehicle,
a respective forecast regarding an arrival time of a respective electric vehicle following use of the electric vehicle in question outside the charging station, on the basis of a timetable of the electric vehicle,
a respective forecast or specification regarding a state of charge of the electrical storage unit at an end of the provision period,
a respective departure time of an electric vehicle that indicates the time at which the electric vehicle in question leaves the charging station, wherein the departure time uses a timetable relevant to the electric vehicle in question,
a respective charging power of a storage unit that denotes the power that the storage unit has output and drawn within the provision period, and
a respective history regarding charging cycles of a storage unit that it has performed up to now.

14. A charging infrastructure for a plurality of electric vehicles of a fleet for providing electric exchange power of the plurality of electric vehicles for feeding into an electricity supply grid or drawing from the electricity supply grid, wherein:
a positive exchange power denotes an electric power drawn from the electricity supply grid by the fleet, and
a negative exchange power denotes an electric power fed into the electricity supply grid by the fleet,
wherein each electric vehicle has an electrical storage unit having a changeable state of charge, and a charging terminal coupled to the electrical storage unit for charging or discharging the electrical storage unit of the electric vehicle, and
wherein a sum of the changeable states of charge of the electric vehicles of the fleet, forms a changeable sum state of charge, the charging infrastructure comprising:
a charging controller configured to actuate the charging terminals and determine a state of charge range for a provision period, the state of charge range spanning an operating range that contains the sum state of charge, wherein the state of charge range is delimited by:
a time-dependent upper limit that specifies maximum values not to be exceeded for the sum state of charge in a time-dependent manner, and
a time-dependent lower limit that specifies minimum values not to be dropped below for the sum state of charge in a time-dependent manner,
wherein the charging controller is configured to:
determine the state of charge range based on the states of charge of the plurality of electric vehicles,
control the electric exchange power, for feeding into the electricity supply grid and drawing from the electricity supply grid, in the provision period such that the sum state of charge does not leave the state of charge range
forecast a starting charging point of the state of charge range by determining a starting state of charge of the sum state of charge at a starting time,
wherein the starting state of charge is forecast at the starting time, and/or
wherein the starting time is forecast, such that:
all of the plurality of electric vehicles have reached the charging infrastructure,
a predetermined portion of the plurality of electric vehicles has reached the charging infrastructure,
a number of electric vehicles of the plurality of electric vehicles have reached the charging infrastructure such that a sum of their states of charge has reached a specified minimum starting value of the sum state of charge, and/or
a number of electric vehicles of the plurality of electric vehicles have reached the charging infrastructure that a sum of their storage capacities has a specified minimum storage capacity,
assign an expected probability to the forecast starting charging point of the state of charge range, and
assign an expected probability in each case to the forecast starting time, wherein:
deviations between a forecast starting state of charge and a recorded sum state of charge are corrected, and
a value of the starting charging point of the state of charge range for a predetermined availability is forecast as an availability value.

15. The method as claimed in claim 1, wherein the state of charge range for the provision period is determined for a period while the plurality of electric vehicles are charged overnight.

16. The charging infrastructure as claimed in claim 14, wherein the state of charge range for the provision period is determined for a period while the plurality of electric vehicles are charged overnight.

17. A method for providing electric exchange power for a plurality of electric vehicles of a fleet of electric vehicles for feeding into an electricity supply grid or drawing from the electricity supply grid by way of a charging infrastructure of the fleet, wherein the electric exchange power comprises:
a positive exchange power that denotes an electric power drawn from the electricity supply grid by the fleet; and
a negative exchange power that denotes an electric power fed into the electricity supply grid by the fleet; and
wherein:
each electric vehicle has an electrical storage unit having a changeable state of charge, and
a sum of the changeable states of charge of the electric vehicles of the fleet forms a changeable sum state of charge, the method comprising:
determining a state of charge range for a provision period, wherein the state of charge range spans an operating range that contains a sum state of charge, wherein the state of charge range is delimited by:
a time-dependent upper limit that specifies maximum values not to be exceeded for the sum state of charge in a time-dependent manner, and
a time-dependent lower limit that specifies minimum values not to be dropped below for the sum state of charge in a time-dependent manner,
determining the state of charge range is based on the states of charge of the plurality of electric vehicles, and
controlling the electric exchange power, for feeding into the electricity supply grid and drawing from the electricity supply grid, in the provision period such that the sum state of charge does not leave the state of charge range,
wherein a charging controller of the charging infrastructure determines the state of charge range for the provision period based on forecast states of charge of the electrical storage units of the electric vehicles, wherein the provision period is in the future,
wherein the state of charge range, a variation range, and/or an exchange rule is transmitted to a grid operator or a grid controller,
wherein the grid operator or the grid controller specifies the exchange power for the provision period in the form of a temporal sequence or in the form of a prediction, based on the state of charge range, the variation range or the exchange rule,
wherein the charging controller controls the exchange power in the provision period in accordance with the specified temporal sequence by appropriately actuating individual charging terminals or the individual charging terminals, and wherein additional active power and/or reactive power for regulating the electricity supply grid is offered to the electricity supply grid based on the state of charge range, the variation range and/or the exchange rule and the sum state of charge.

\* \* \* \* \*